US009258505B2

(12) United States Patent
Ikeda

(10) Patent No.: US 9,258,505 B2
(45) Date of Patent: Feb. 9, 2016

(54) IMAGING APPARATUS, IMAGING SYSTEM, METHOD FOR DRIVING IMAGING APPARATUS, AND METHOD FOR DRIVING IMAGING SYSTEM

(71) Applicant: CANON KABUSHIKI KAISHA, Tokyo (JP)

(72) Inventor: Yasuji Ikeda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/305,285

(22) Filed: Jun. 16, 2014

(65) Prior Publication Data

US 2014/0368707 A1 Dec. 18, 2014

(30) Foreign Application Priority Data

Jun. 17, 2013 (JP) ................................ 2013-126704

(51) Int. Cl.

| | |
|---|---|
| ***H04N 5/232*** | (2006.01) |
| ***G03B 13/00*** | (2006.01) |
| ***H04N 5/378*** | (2011.01) |
| ***H04N 5/369*** | (2011.01) |

(52) U.S. Cl.

CPC ............. *H04N 5/378* (2013.01); *H04N 5/3696* (2013.01)

(58) Field of Classification Search

CPC ....... H04N 5/3696; H04N 5/378; G02B 7/34; G03B 13/20

USPC ........... 348/222.1, 230.1, 294, 301, 302, 316, 348/340, 345, 349, 353, 356; 356/3.13-3.16

See application file for complete search history.

(56) References Cited

U.S. PATENT DOCUMENTS

| | | | | |
|---|---|---|---|---|
| 2013/0128085 A1* | 5/2013 | Yamada ................. | H04N 5/335 | 348/294 |
| 2014/0071319 A1* | 3/2014 | Ikemoto ................. | H04N 5/335 | 348/294 |

FOREIGN PATENT DOCUMENTS

| | | |
|---|---|---|
| JP | 2004-134867 A | 4/2004 |

* cited by examiner

*Primary Examiner* — Nhan T Tran
*Assistant Examiner* — Chriss Yoder, III
(74) *Attorney, Agent, or Firm* — Canon USA, Inc. IP Division

(57) ABSTRACT

Provided is an imaging apparatus that generates a signal based on the sum of signals output by a plurality of pixels, and a signal based on the difference between the signals output by the plurality of signals, and performs AD conversion on the generated signals.

21 Claims, 11 Drawing Sheets

50
35
PRES[0]
PTX[0]
PSEL[0]
PRES[1]
PTX[1]
PSEL[1]
100-1
100-2
100-3
100-4
100-5
100-6
100-7
100-8
6-1
6-2
6-3
6-4
7-1
7-2
7-3
7-4
200-1
200-2
10-1
10-2
11-1
11-2
ADDER CIRCUIT
SUBTRACTOR CIRCUIT
250-1
250-2
250-3
250-4
COMPARATOR
8-1
8-2
8-3
8-4
30-1
30-2
30-3
30-4
MEMORY
RMP
9
RAMP GENERATION CIRCUIT
20
COUNTER
40
HORIZONTAL SCAN CIRCUIT
CALCULATION UNIT

PRES[0]
PTX[0]
PSEL[0]
PRES[1]
PTX[1]
PSEL[1]
35
50
100-1
100-2
100-3
100-4
100-5
100-6
100-7
100-8
6-1
6-2
6-3
6-4
7-1
7-2
7-3
7-4
200-1
200-2
ADDER CIRCUIT
SUBTRACTOR CIRCUIT
10-1
10-2
11-1
11-2
SW84-1
SW84-2
COMPARATOR
8-1
8-2
MEMORY
30-1
30-2
250-1
250-2
RMP
RAMP GENERATION CIRCUIT
9
COUNTER
20
HORIZONTAL SCAN CIRCUIT
40

35
PRES[0]
PTX[0]
PSEL[0]
PRES[1]
PTX[1]
PSEL[1]
50
100−1
100−2
100−3
100−4
100−5
100−6
100−7
100−8
6−1
6−2
6−3
6−4
7−1
7−2
7−3
7−4
10−1
11−1
C10
C11
C12
C13
SW81
SW82
SW83
Cfb−1
Cfb−2
SW80−1
SW80−2
12−1
12−2
SW84−1
H
L
250−1
8−1
COMPARATOR
30−1
MEMORY
Vref1
Vref2
200−1
200−2
RMP
9
RAMP GENERATION CIRCUIT
20
COUNTER
40
HORIZONTAL SCAN CIRCUIT PRES[0]
PTX[0]
PSEL[0]
PRES[1]
PTX[1]
PSEL[1]
35
50
100-1
100-2
100-3
100-4
100-5
100-6
100-7
100-8
6-1
6-2
6-3
6-4
7-1
7-2
7-3
7-4
200-1
200-2
15-1
15-2
ADDER/SUBTRACTOR CIRCUIT
ADDER/SUBTRACTOR CIRCUIT
COMPARATOR
COMPARATOR
8-1
8-2
30-1
30-2
MEMORY
MEMORY
250-1
250-2
RMP
RAMP GENERATION CIRCUIT
9
COUNTER
20
HORIZONTAL SCAN CIRCUIT
40

50
100−1
100−2
100−3
100−4
100−5
100−6
100−7
100−8
7−1
7−2
7−3
7−4
6−1
6−2
6−3
6−4
200−1
200−2
15−1
PRES[0]
PTX[0]
PSEL[0]
PRES[1]
PTX[1]
PSEL[1]
35
C20−1
C20−2
SW90
SW91
SW92
SW93
SW80
Cfb
C30
12
Vref
RMP
250−1
8−1
COMPARATOR
30−1
MEMORY
RAMP GENERATION CIRCUIT
9
COUNTER
20
HCRIZONTAL SCAN CIRCUIT
40

IMAGING APPARATUS, IMAGING SYSTEM, METHOD FOR DRIVING IMAGING APPARATUS, AND METHOD FOR DRIVING IMAGING SYSTEM

BACKGROUND OF THE INVENTION

1. Field of the Invention

The present invention relates to an imaging apparatus including a pixel having a photoelectric conversion unit, and an AD conversion unit.

2. Description of the Related Art

Japanese Patent Application Laid-Open No. 2004-134867 describes an imaging apparatus having a plurality of pixels that each accumulates signal charge based on incident light. The imaging apparatus described in Japanese Patent Application Laid-Open No. 2004-134867 outputs, to a vertical signal line, a signal based on the sum of signals of the plurality of pixels.

SUMMARY OF THE INVENTION

The present invention has been made to solve the above problem, and a first aspect thereof is an imaging apparatus including: a first and a second pixel each including a photoelectric conversion unit to generate signal charge based on incident light, the first and the second pixel configured to output a first and a second photoelectric conversion signal respectively; a circuit configured to generate a first signal based on a sum of the first and the second photoelectric conversion signal, and a second signal based on a difference between the first and the second photoelectric conversion signal, respectively; and an AD conversion unit configured to convert the first and the second signal respectively into digital signals.

Moreover, another aspect of the present invention is a method for driving an imaging apparatus including a first and a second pixel each having a photoelectric conversion unit to generate signal charge based on incident light, a circuit unit, and an AD conversion unit, the method including:

outputting, by each of the first and the second pixel, a first and a second photoelectric conversion signal to the circuit unit by the photoelectric conversion units of the first and the second pixel being exposed to light at the same exposure end timing;

generating, by the circuit unit, a first signal based on a sum of the first and the second photoelectric conversion signal, and a second signal based on a difference between the first and the second photoelectric conversion signal, respectively; and converting the first and the second signal respectively into digital signals by the AD conversion unit.

Moreover, still another aspect of the present invention is a method for driving an imaging system including an imaging apparatus and an output signal processing unit, the imaging apparatus including: a first pixel and a second pixel, the first and the second pixel each having a photoelectric conversion unit to generate signal charge based on incident light; one microlens configured to concentrate light on the first and the second pixel; a circuit unit; and an AD conversion unit, the method including:

outputting, by each of the first and the second pixel, a first and a second photoelectric conversion signal to the circuit unit by the photoelectric conversion units of the first and the second pixel being exposed to light at the same exposure end timing;

generating, by the circuit unit, a first signal based on a sum of the first and the second photoelectric conversion signal, and a second signal based on a difference between the first and the second photoelectric conversion signal, respectively;

converting the first and the second signal respectively into digital signals by the AD conversion unit;

outputting the digital signal based on the first signal and the digital signal based on the second signal respectively to the output signal processing unit by the imaging apparatus; and generating an image by the digital signal based on the first signal, and performing focus detection by the digital signal based on the second signal by the output signal processing unit.

Further features of the present invention will become apparent from the following description of exemplary embodiments (with reference to the attached drawings).

DESCRIPTION OF THE EMBODIMENTS

An imaging apparatus may use a signal based on the difference between signals output by a plurality of pixels for various purposes. However, Japanese Patent Application Laid-Open No. 2004-134867 does not give a description of such a signal based on the difference between signals output by a plurality of pixels.

Embodiments described below provide a technology that is advantageous in a case of using a signal based on the difference between signals output by a plurality of pixels.

Hereinafter, the embodiments are described with reference to the drawings.

First Embodiment

Figure 1:
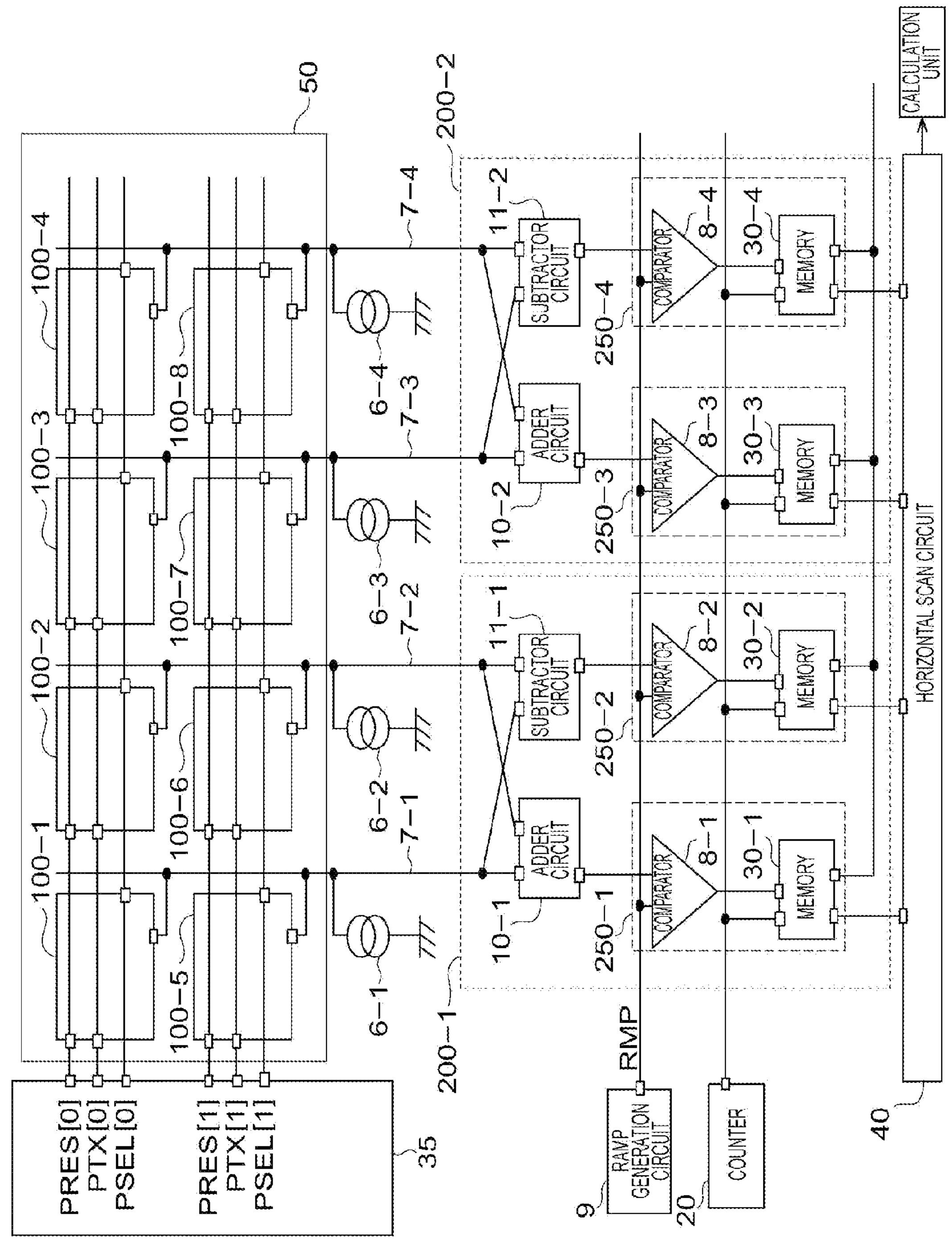
FIG. 1 is a diagram illustrating an example of the configuration of an imaging apparatus.

FIG. 1 is a diagram illustrating an imaging apparatus of the embodiment. FIG. 1 schematically illustrates pixels 100-1 to 100-8 of two rows by four columns. A vertical scan circuit 35 controls the pixels 100-1 to 100-8 on a row-by-row basis. A pixel array 50 is provided with the pixels 100-1 to 100-8 in matrix form. The pixels 100-1 to 100-4, which are provided in the first row, are described below. The pixels 100-1 to 100-4 of the columns output signals to vertical signal lines 7-1 to 7-4 respectively. Current sources 6-1 to 6-4 supply electric currents to vertical signal lines 7-1 to 7-4 respectively. Moreover, signals output by the pixels 100-1 and 100-2 respectively to the vertical signal lines 7-1 and 7-2 are input into an adder circuit 10-1 and a subtractor circuit 11-1. Similarly, signals output by the pixels 100-3 and 100-4 respectively to the vertical signal lines 7-3 and 7-4 are input into an adder circuit 10-2 and a subtractor circuit 11-2.

A signal processing circuit 200-1 includes the adder circuit 10-1, the subtractor circuit 11-1, and AD conversion units 250-1 and 250-2. The AD conversion unit 250-1 includes a comparator 8-1 and a memory 30-1. The AD conversion unit 250-2 includes a comparator 8-2 and a memory 30-2. A description is given below of the signal processing circuit 200-1 provided for the columns having the pixels 100-1 and 100-2. The configuration and operation of a signal processing circuit 200-2 are similar to those of the signal processing circuit 200-1.

The adder circuit 10-1 outputs, to the comparator 8-1, a signal based on the sum of signals output to the vertical signal lines 7-1 and 7-2. Moreover, the subtractor circuit 11-1 outputs, to the comparator 8-2, a signal based on the difference between signals output to the vertical signal lines 7-1 and 7-2.

A ramp generation circuit 9 outputs a ramp signal RMP to the comparators 8-1 and 8-2 respectively. The ramp signal RMP is a signal whose potential changes depending on time. The comparator 8-1 outputs, to the memory 30-1, a comparison result signal CMP indicating a result of comparing the potential of the signal output by the adder circuit 10-1 and the potential of the ramp signal RMP. A counter 20 outputs, to the memories 30-1 and 30-2, a count signal representing the count of clock signals input from an unillustrated timing generator. The memory 30-1 holds the count signal when the signal value of the comparison result signal CMP output by the comparator 8-1 changes. Moreover, the comparator 8-2 outputs, to the memory 30-2, the comparison result signal CMP indicating a result of comparing the potential of the signal output by the subtractor circuit 11-1 and the potential of the ramp signal RMP. The memory 30-2 holds the count signal based on a timing when the signal value of the comparison result signal CMP output by the comparator 8-2 changes. The memories 30-1 and 30-2 are count signal holding units that hold the count signal.

A horizontal scan circuit 40 transfers the count signals held by the memories 30-1 to 30-4 sequentially to an unillustrated calculation unit. The unillustrated calculation unit outputs, to the outside of the imaging apparatus, signals obtained by processing the signals output from the memories 30-1 to 30-4.

Figure 2:
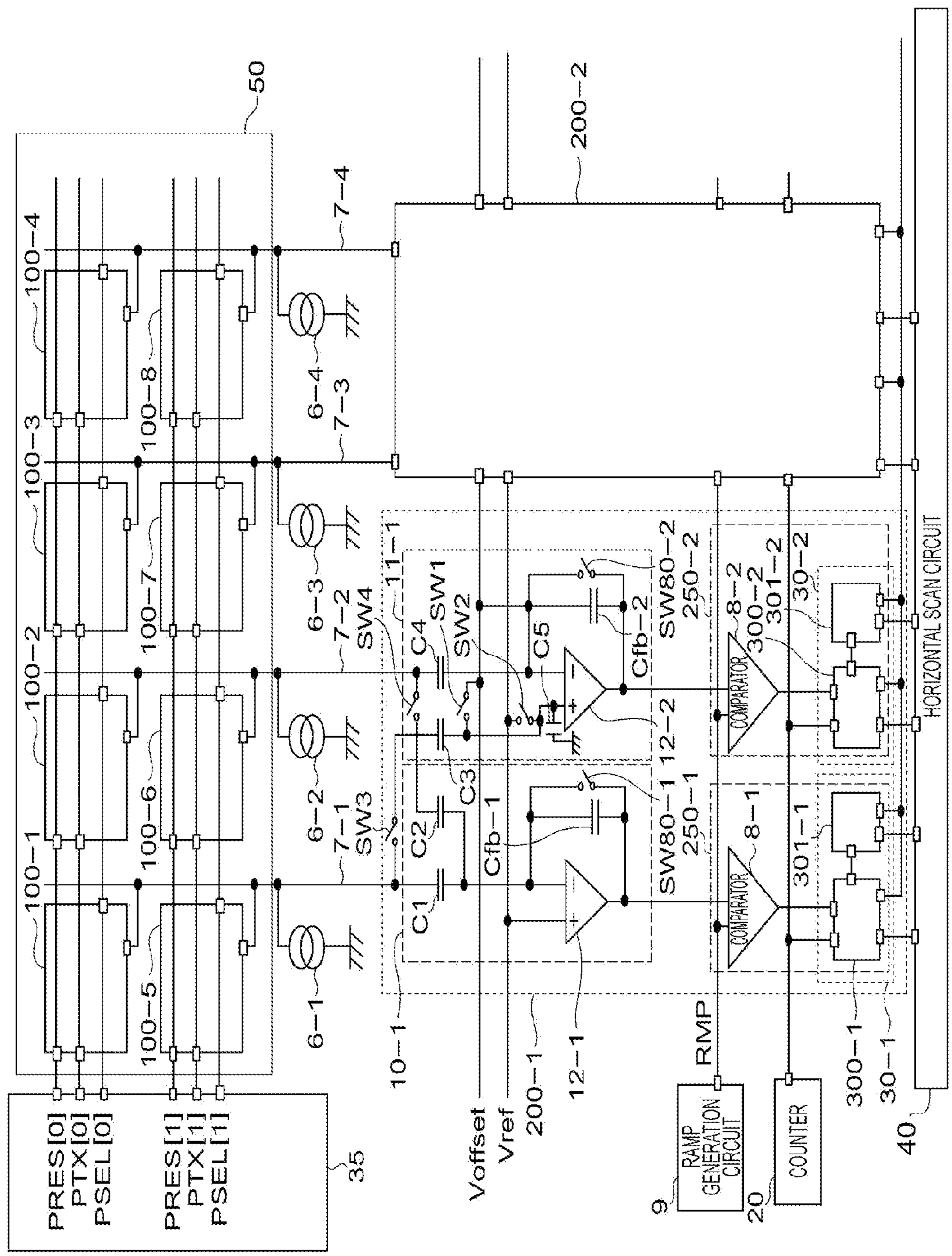
FIG. 2 is a diagram illustrating an example of the configuration of the imaging apparatus.

FIG. 2 is a diagram illustrating the details of the signal processing circuit 200-1 of the imaging apparatus illustrated in FIG. 1, and the configuration of the imaging apparatus. In FIG. 2, the same reference numerals are assigned to the same members as those in FIG. 1, and their detailed descriptions are omitted. A description is given below of an example where the pixels 100-1 to 100-4 of the first row of FIG. 2 output signals to the vertical signal lines 7-1 to 7-4, respectively.

The adder circuit 10-1 includes capacitive elements C1 and C2, an inverting amplifier 12-1, switches SW3 and SW80-1, and a feedback capacitive element Cfb-1. The subtractor circuit 11-1 includes capacitive elements C3, C4, and C5, switches SW1, SW2, SW4, and SW80-2, an inverting amplifier 12-2, and a feedback capacitive element Cfb-2.

The capacitive element C1 is provided on an electrical path between the pixel 100-1 and an inverting input node of the inverting amplifier 12-1. The switch SW3 and the capacitive element C3 are provided on an electrical path between the pixel 100-1 and a non-inverting input node of the inverting amplifier 12-2. Moreover, the switch SW4 and the capacitive element C2 are provided on an electrical path between the pixel 100-2 and the inverting input node of the inverting amplifier 12-1. The capacitive element C4 is provided on an electrical path between the pixel 100-2 and an inverting input node of the inverting amplifier 12-2. The capacitive elements C1 and C3 respectively hold electric charge based on the potential of the vertical signal line 7-1. The capacitive elements C2 and C4 respectively hold electric charge based on the potential of the vertical signal line 7-2.

A reference potential Vref is input into a non-inverting input node of the inverting amplifier 12-1 from an unillustrated reference potential supply unit. On the other hand, a signal based on the charges of the capacitive elements C1 and C2 is input into the inverting input node of the inverting amplifier 12-1. Moreover, the feedback capacitive element Cfb-1 and the switch SW80-1 are provided on a feedback path between the inverting input node and an output node of the inverting amplifier 12-1. When the timing generator brings the switch SW80-1 into conduction, the charge of the feedback capacitive element Cfb-1 is reset.

A signal based on the charge of the capacitive element C3 is input into the non-inverting input node of the inverting amplifier 12-2. Moreover, when the timing generator brings the switch SW2 into conduction, the reference potential Vref is input into the non-inverting input node of the inverting amplifier 12-2 from the reference potential supply unit. On the other hand, a signal based on the charge of the capacitive element C4 is input into the inverting input node of the inverting amplifier 12-2. Moreover, the feedback capacitive element Cfb-2 and the switch SW80-2 are provided on a feedback path between the inverting input node and an output node of the inverting amplifier 12-2. When the timing generator brings the switch SW80-2 into conduction, the charge of the feedback capacitive element Cfb-2 is reset.

Moreover, when the timing generator brings the switch SW1 into conduction, a reference voltage Voffset is input into the inverting input node of the inverting amplifier 12-2.

The memory 30-1 includes sub-memories 300-1 and 301-1. The counter 20 outputs the count signal to the sub-memory 300-1. The count signal held by the sub-memory 300-1 is input into the sub-memory 301-1 by the control of the timing generator.

Figure 3A:
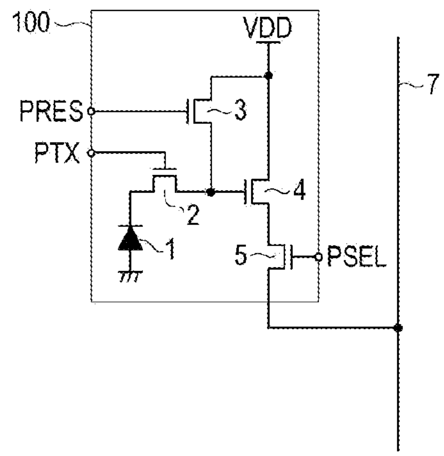
FIG. 3A is a diagram illustrating an example of the configuration of a pixel.

FIG. 3A is a diagram illustrating the configuration of the pixel 100-1 of the embodiment. The configurations of the other pixels 100-2 to 100-8 are the same as the configuration of the pixel 100-1. The pixel 100-1 includes a photodiode 1, a transfer MOS transistor 2, a reset MOS transistor 3, an amplification MOS transistor 4, and a selection MOS transistor 5.

The photodiode 1 is a photoelectric conversion unit that generates signal charge according to the quantity of incident light. In the embodiment, a description is given assuming that the signal charge output by the photodiode 1 is electrons. When the vertical scan circuit 35 illustrated in FIG. 2 sets a signal PTX that controls the conduction of the transfer MOS transistor 2 at a High level (hereinafter denoted by the H level. Similarly, a Low level is denoted by the L level), signal charge generated by the photodiode 1 is transferred to an input node of the amplification MOS transistor 4. In the embodiment, a timing when the timing generator sets the signal PTX at the H level is an exposure end timing of the photodiode 1. Another example of the exposure end timing is one when the exposure of the photodiode 1 is ended by closing a mechanical shutter if the mechanical shutter is provided to an optical system that guides light to the imaging apparatus. When the vertical scan circuit 35 sets a signal PSEL that controls the conduction of the selection MOS transistor 5 at the H level, the amplification MOS transistor 4 outputs a signal to the vertical signal line 7 via the selection MOS transistor 5. When the vertical scan circuit 35 sets a signal PRES that controls the conduction of the reset MOS transistor 3 at the H level, the potential of the input node of the amplification MOS transistor 4 is reset in accordance with the potential of a power supply VDD. Hereinafter, a signal that is output by each of the pixels 100-1 to 100-8 after the input node of the amplification MOS transistor 4 is reset is denoted by the noise signal. Moreover, a signal that is output by each of the pixels 100-1 to 100-8 when the input node of the amplification MOS transistor 4 is at a potential based on the signal charge generated by the photodiode 1 is denoted by the photoelectric conversion signal. The first and the second photoelectric conversion signal indicated in the claims are respectively photoelectric conversion signals output respectively by the pixels 100-1 and 100-2 in the embodiment. The circuit unit into which the first and the second photoelectric conversion signal are input is the adder circuit 10-1 and the subtractor circuit 11-1.

Figure 3B:
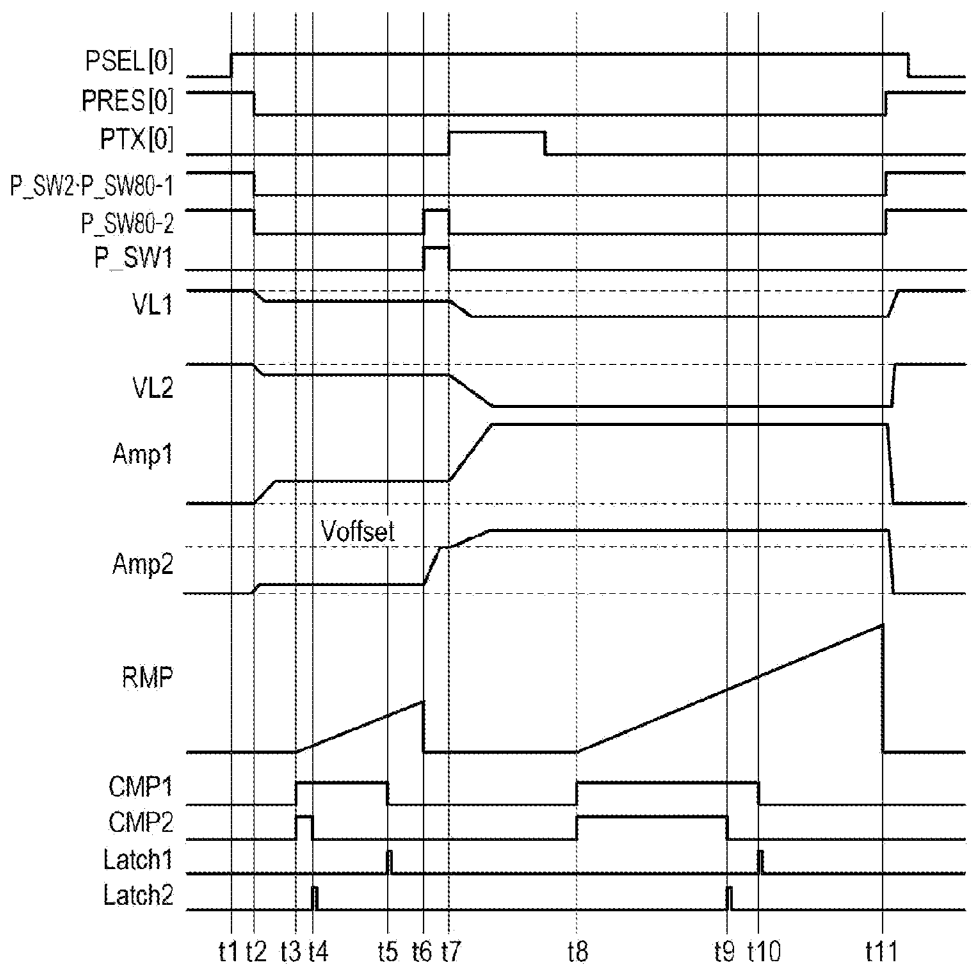
FIG. 3B is a diagram illustrating an example of the operation of the imaging apparatus.

FIG. 3B is a diagram illustrating the operation of the pixel row including the pixel 100-1 of the imaging apparatus illustrated in FIG. 2. In the timing diagram illustrated in FIG. 3B, the operations of the switches SW3 and SW4 are not illustrated, but the switches SW3 and SW4 are both conducting during the period from time t1 to time t11.

A signal P_SW80-1 illustrated in FIG. 3B is a signal that controls the switch SW80-1. When the signal P_SW80-1 is at the H level, the switch SW80-1 is conducting. When the signal P_SW80-1 is at the L level, the switch SW80-1 is not conducting. Hereinafter, the other switches SW are also similarly assumed that when a signal that controls the switch SW is at the H level, the switch SW is conducting, and when the signal is at the L level, the switch SW is not conducting.

A signal P_SW80-2 is a signal that controls the switch SW80-2. A signal P_SW1 is a signal that controls the switch SW1. VL1 and VL2 respectively denote the potentials of the vertical signal lines 7-1 and 7-2. Amp1 and Amp2 respectively denote the potentials of the signals output by the inverting amplifiers 12-1 and 12-2. Ramp denotes the potential of the ramp signal Ramp. CMP1 and CMP2 respectively denote the signal values of the comparison result signals CMP output by the comparators 8-1 and 8-2. Latch1 and Latch2 respectively denote latch signals generated by the memories 30-1 and 30-2. The latch signal Latch is a signal whose signal value changes according to a change in the signal value of the comparison result signal CMP. The sub-memories 300-1 and 300-2 of the memories 30-1 and 30-2 hold the count signal when the signal value of the latch signal Latch changes.

At time t1, the vertical scan circuit 35 sets a signal PSEL[0] at the H level. Moreover, at time t1, signals PRES[0], P_SW2, P_SW80-1, and P_SW80-2 are at the H level. Since the signal PRES[0] is at the H level, the potentials of the input nodes of the amplification MOS transistors 4 of the pixels 100-1 to 100-4 are reset. Moreover, since the signal P_SW2 is at the H level, the charges of the capacitive elements C3 and C5 are reset. Moreover, since the signal P_SW80-1 is at the H level, the charges of the capacitive element C1 and the feedback capacitive element Cfb-1 are reset. Moreover, since the signal P_SW80-2 are at the H level, the charges of the capacitive element C4 and the feedback capacitive element Cfb-2 are reset.

At time t2, the vertical scan circuit 35 changes the signal PRES[0] from the H level to the L level. Consequently, the reset of the input nodes of the amplification MOS transistors 4 is cancelled. Moreover, the timing generator changes the signals P_SW2, P_SW80-1, and P_SW80-2 from the H level to the L level. Consequently, the reset of the capacitive elements C1 to C4 and the feedback capacitive elements Cfb-1 and Cfb-2 is cancelled. The potential VL1 of the vertical signal line 7-1 is reduced by the noise signal output by the pixel 100-1. Similarly, the potential VL2 of the vertical signal line 7-2 is reduced by the noise signal output by the pixel 100-2.

The output Amp1 of the inverting amplifier 12-1 during the period from time t2 to time t3 has the potential of a signal obtained by inverting and amplifying the sum of the noise signals output by the pixels 100-1 and 100-2. Moreover, the output Amp2 of the inverting amplifier 12-2 has the potential of a signal obtained by inverting and amplifying the difference between the noise signals of the pixels 100-1 and 100-2.

At time t3, the ramp generation circuit 9 starts the time-dependent change of the potential of the ramp signal RMP. The signal values of the comparison result signals CMP1 and CMP2 are both at the H level.

At time t4, the signal value of the comparison result signal CMP2 changes from the H level to the L level. Consequently, the potential of the latch signal Latch2 changes. The sub-memory 300-2 holds the count signal at this point in time. The count signal held by the sub-memory 300-2 at this point in time is a digital signal based on the difference between the noise signals of the pixels 100-1 and 100-2.

At time t5, the signal value of the comparison result signal CMP1 changes from the H level to the L level. Consequently, the potential of the latch signal Latch1 changes. The sub-memory 300-1 holds the count signal at this point in time. The count signal held by the sub-memory 300-1 at this point in time is a digital signal based on the sum of the noise signals of the pixels 100-1 and 100-2.

At time t6, the ramp generation circuit 9 ends the time-dependent change of the potential of the ramp signal RMP, and resets the potential of the ramp signal RMP. The timing generator causes the sub-memories 301-1 and 301-respectively to hold the digital signals held respectively by the sub-memories 300-1 and 300-2.

Moreover, at time t6, the timing generator sets the signals P_SW80-2 and P_SW1 at the H level. Consequently, the potential of the output Amp2 of the inverting amplifier 12-2 is equal to the potential obtained by adding the potential of the reference voltage Voffset to the potential at time t5. The timing generator subsequently sets the signals P_SW80-2 and P_SW1 at the L level.

At time t7, the vertical scan circuit 35 sets the signal PTX [0] at the H level. Consequently, the pixel 100-outputs the photoelectric conversion signal to the vertical signal line 7-1. Therefore, the potential VL1 of the vertical signal line 7-1 decreases. The pixel 100-2 similarly outputs the photoelectric conversion signal to the vertical signal line 7-2. Therefore, the potential VL2 of the vertical signal line 7-2 decreases. In the operation illustrated in FIG. 3B, it is assumed that the pixel 100-2 has a larger quantity of incident light than the pixel 100-1. In other words, the vertical signal line 7-2 has a greater change in the potential of the vertical signal line 7 made by the vertical scan circuit 35 setting the signal PTX[0] at the H level, than the vertical signal line 7-1. The output Amp1 of the inverting amplifier 12-1 has the potential of a signal obtained by inverting and amplifying a signal based on the sum of the photoelectric conversion signals of the pixels 100-1 and 100-2. Moreover, the output Amp2 of the inverting amplifier 12-2 has the potential of a signal obtained by inverting and amplifying a signal of the difference between the photoelectric conversion signals of the pixels 100-1 and 100-2. The vertical scan circuit 35 subsequently changes the signal PTX[0] from the H level to the L level.

At time t8, the ramp generation circuit 9 starts the time-dependent change of the potential of the ramp signal RMP. The signal values of the comparison result signals CMP1 and CMP2 are both at the H level.

At time t9, the signal value of the comparison result signal CMP2 changes from the H level to the L level. Consequently, the potential of the latch signal Latch2 changes. The sub-memory 300-2 holds the count signal at this point in time. The count signal held by the sub-memory 300-2 at this point in time is a digital signal based on the difference between the photoelectric conversion signals of the pixels 100-1 and 100-2.

At time t10, the signal value of the comparison result signal CMP1 changes from the H level to the L level. Consequently, the potential of the latch signal Latch1 changes. The sub-memory 300-1 holds the count signal at this point in time. The count signal held by the sub-memory 300-1 at this point in time is a digital signal based on the sum of the photoelectric conversion signals of the pixels 100-1 and 100-2.

At time t11, the ramp generation circuit 9 ends the time-dependent change of the potential of the ramp signal RMP, and resets the potential of the ramp signal RMP. The horizontal scan circuit 40 sequentially scans the memories 30-1 to 30-4 of the columns. Consequently, the digital signals held by the memories 30-1 to 30-4 are input into the calculation unit.

A description is given of the reason that the output Amp2 of the inverting amplifier 12-2 is shifted to a potential based on the reference signal Voffset at time t6. It is assumed here that the photoelectric conversion signal output by the pixel 100-1 is greater in signal amplitude than the photoelectric conversion signal output by the pixel 100-2. In this case, the vertical signal line 7-1 is greater in signal amplitude than the vertical signal line 7-2. Hence, when the timing generator sets the signal PTX at the H level at time t7, the potential of the output Amp2 of the inverting amplifier 12-2 decreases from the potential Voffset. If the output Amp2 is not shifted to the potential of the reference signal Voffset at time t6, the potential of the output Amp2 may decrease below the potential of the ramp signal RMP at time t8. In this case, the signal value of the comparison result signal CMP2 does not change during the period from time t8 to time t11. Accordingly, the sub-memory 300-2 cannot hold the count signal. The potential of the output Amp2 is required to be within the range of changes of the potential of the ramp signal RMP in order to allow the signal value of the comparison result signal CMP2 to change in this manner during the period from time t8 to time t11. Therefore, the output Amp2 is shifted to the potential of the reference signal Voffset at time t6. The potential of the reference signal Voffset is a potential that shifts the potential of the output Amp2 in such a manner as to be farther from the start potential of the time-dependent potential change of the ramp signal RMP and closer to the end potential of the potential change, than a case where the inverting amplifier 12-2 is reset at the reference potential Vref.

A description will be given here of the digital signals held by the memories 30-1 and 30-2 at time t11.

Hereinafter, the noise signals output respectively by the pixels 100-1 and 100-2 are denoted by an N1 signal and an N2 signal. Moreover, the photoelectric conversion signals output respectively by the pixels 100-1 and 100-2 are denoted by an A+N1 signal and a B+N2 signal. The digital signal held by the sub-memory 301-1 at time t11 is a digital signal based on an N1+N2 signal. The digital signal held by the sub-memory 300-1 at time t11 is a digital signal based on an A+N1+B+N2 signal. The digital signal held by the sub-memory 301-2 at time t11 is a digital signal based on an N1−N2 signal. The digital signal held by the sub-memory 300-2 at time t11 is a digital signal based on an (A+N1)−(B+N2) signal. The calculation unit generates a signal of the difference between the digital signal held by the sub-memory 300-1 and the digital signal held by the sub-memory 301-1. In other words, the signal generated by the calculation unit is an A+N1+B+N2−(N1+N2)=A+B signal. Moreover, the calculation unit generates a signal of the difference between the digital signal held by the sub-memory 300-2 and the digital signal held by the sub-memory 301-2. In other words, the signal generated by the calculation unit is an (A+N1)−(B+N2)−(N1−N2)=A−B signal. Therefore, the calculation unit generates the (A+B) signal and the (A−B) signal.

As another example of the embodiment, it is possible to implement correlated double sampling (hereinafter denoted by CDS) that causes the capacitive elements C1 and C2 to hold a signal based on the N1 signal, and causes the capacitive elements C3 and C4 to hold a signal based on the N2 signal. In this case, the digital signal held by the sub-memory 301-1 at time t11 is a digital signal based on an offset component (hereinafter denoted by the OFF signal) that appears as an inter-column variation of the inverting amplifiers 12-1 and 12-2 and the comparators 8-1 and 8-2. The digital signal held by the sub-memory 300-1 at time t11 is an A+B+OFF signal. The calculation unit generates a signal of the difference between the digital signal held by the sub-memory 300-1 and the digital signal held by the sub-memory 301-1. In other words, the signal generated by the calculation unit is the A+B signal. On the other hand, the digital signal held by the sub-memory 301-2 at time t11 is also the OFF signal. Moreover, the digital signal held by the sub-memory 300-2 at time t11 is the sum of an A−B+OFF signal and the digital signal (hereinafter denoted by the Shift signal) based on the potential difference between the reference signal Voffset and the reference potential Vref, and accordingly, is expressed as the A−B+OFF+Shift signal. The calculation unit generates a signal of the difference between the digital signal held by the sub-memory 300-2 and the digital signal held by the sub-memory 301-2. In other words, the signal generated by the calculation unit is an A−B+Shift signal. The signal value of the Shift signal is stored in advance in the calculation unit. Accordingly, the calculation unit can subtract the Shift signal from the A−B+Shift signal. Consequently, even in a mode where CDS is implemented using the capacitive elements C1 to C4, the calculation unit can generate the A+B signal and the A−B signal respectively.

The imaging apparatus of the embodiment can generate digital signals based respectively on the A+B signal and the A−B signal. On the other hand, the imaging apparatus of the embodiment brings the switches SW3 and SW4 into non-conduction and the switch SW2 into conduction during the period from time t1 to time t11. The imaging apparatus then performs the operations at time t1 to time t11, the operations being illustrated in FIG. 3B. Consequently, it is possible to generate digital signals based respectively on the A signal and the B signal. Therefore, the imaging apparatus of the embodiment includes the mode of outputting the A signal and the B signal respectively, and the mode of outputting the A+B signal and accordingly can switch the resolution of an image generated. Moreover, the imaging apparatus of the embodiment can output the A−B signal and accordingly can perform edge detection for detecting the contour of an object such as a human face.

Figure 4:
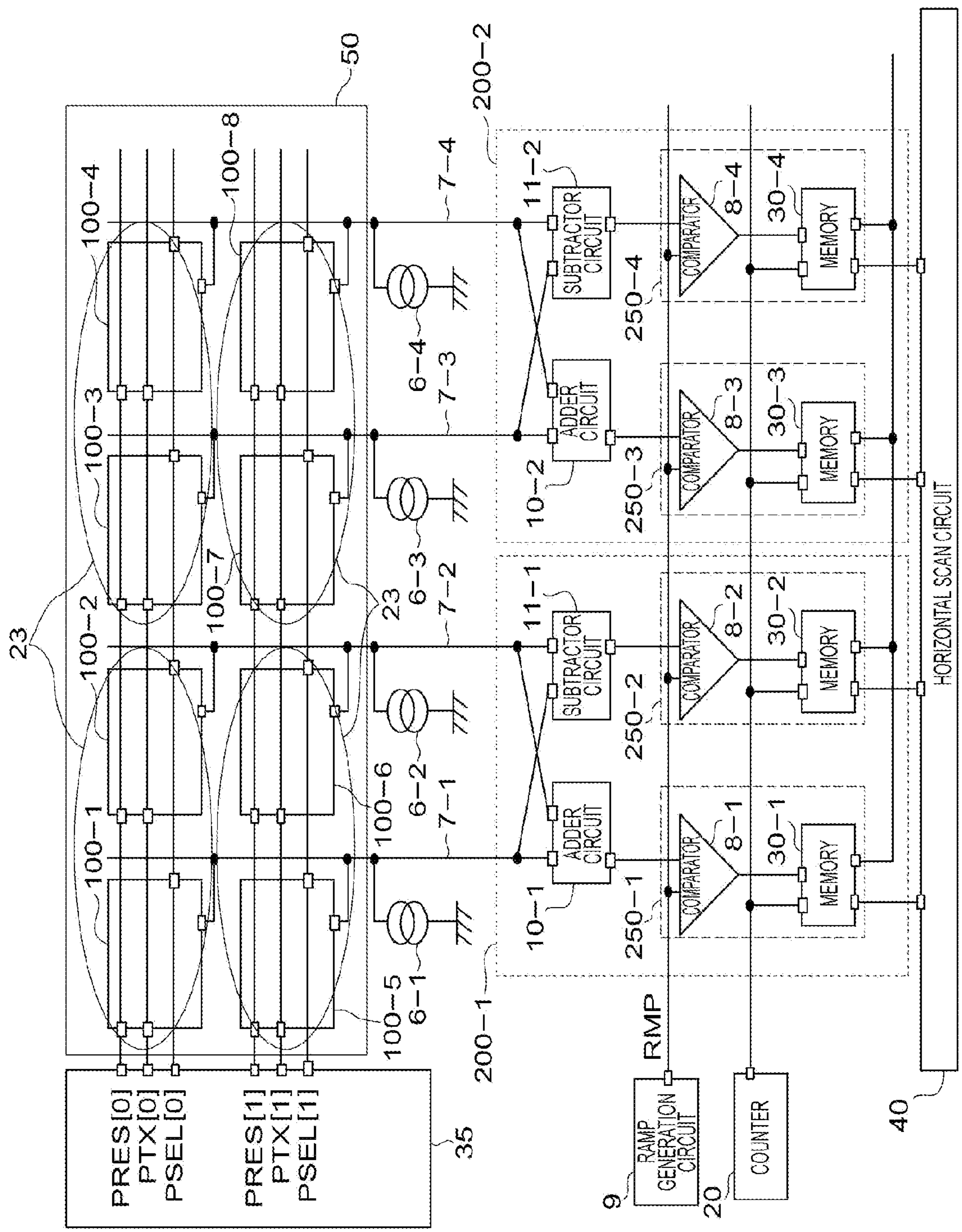
FIG. 4 is a diagram illustrating an example of the configuration of the imaging apparatus.

Next, FIG. 4 illustrates an example of a use mode of the imaging apparatus of the embodiment.

FIG. 4 is a diagram illustrating an example of the arrangement of the pixels 100-1 to 100-8 described in FIG. 1, and microlenses 23 that concentrate light on the photodiodes 1.

One microlens 23 for guiding incident light to the photodiodes 1 of a plurality of the pixels 100-1 and 100-2 is arranged in such a manner as to cover the photodiodes 1 of the plurality of the pixels 100-1 and 100-2. In other words, one microlens is provided for a plurality of photoelectric conversion units. The imaging apparatus in this mode includes a microlens array having a plurality of the microlens 23.

The pixels 100-1 to 100-8 provided in the imaging apparatus of the embodiment output signals to be used for focus detection by the phase difference detection method. The signal to be used for focus detection, the signal being output by each of the pixels 100-1 to 100-8, is hereinafter denoted by the focus detection basic signal. For example, a plurality of pixels in lined positions or cross positions in the pixel array 50 output the focus detection basic signals. A description will be given here of a case where the photoelectric conversion signals output by the plurality of the pixels 100-1 and 100-2 in lined positions are the focus detection basic signals. In the imaging apparatus of the embodiment, the focus detection basic signals are the A signal and the B signal. The imaging apparatus of the embodiment generates the A−B signal and accordingly can detect the phase difference of incident light on the pixels 100-1 and 100-2. Moreover, the imaging apparatus of the embodiment generates the A+B signal and accordingly can obtain a digital signal based on incident light concentrated by one microlens 23. In other words, it is possible to perform focus detection based on the phase difference using the A−B signal, and image generation using the A+B signal. The imaging apparatus of the embodiment can simultaneously output, to the outside of the imaging apparatus, digital signals based respectively on the A−B signal and the A+B signal, which are used for focus detection and image generation.

Furthermore, a mode of an imaging system including an imaging apparatus and an output signal processing unit that processes signals output by the imaging apparatus can be considered. If the imaging apparatus outputs digital signals based respectively on the A signal and the B signal, the output signal processing unit provided outside the imaging apparatus needs to perform calculation processes for obtaining digital signals based respectively on the A−B signal and the A+B signal. In contrast, the imaging apparatus of the embodiment outputs digital signals based respectively on the A−B signal and the A+B signal, and accordingly can reduce the load of the calculation processes of the output signal processing unit. In recent years, the load of the output signal processing unit is increasing with the increasing functionality of the imaging system. The imaging apparatus of the embodiment can further add another function to the output signal processing unit instead of the reduced load of the output signal processing unit. Therefore, the functionality of the imaging system can be increased.

In the embodiment, the counter 20 outputs the common count signal to the memories 30-1 to 30-4 of the columns. As another example, it may be configured such that the counters 20 are respectively provided for the comparators 8-1 to 8-4 of the columns. In this case, it is sufficient if the counter 20 of each column stops counting the clock signals at a timing when the signal value of the latch signal Latch changes. In this case, the counter 20 of each column is a count signal holding unit that holds the count signal based on the signal value of the comparison result signal.

Moreover, in the imaging apparatus of the embodiment, the AD conversion units 250-1 to 250-4 are respectively provided for the columns having the pixels. As another example, the number of the AD conversion units of the imaging apparatus may be one. In this case, the signal processing circuits 200-1 and 200-2 of the columns are provided with a plurality of capacitive elements that respectively hold signals output respectively by the adder circuits 10-1 and 10-2 and the subtractor circuits 11-1 and 11-2. The horizontal scan circuit 40 then scans the capacitive elements of the columns to output signals from the capacitive elements to one AD conversion unit.

Second Embodiment

Hereinafter, an imaging apparatus of the embodiment is described with reference to the drawings, focusing on points different from the first embodiment.

Figure 5:
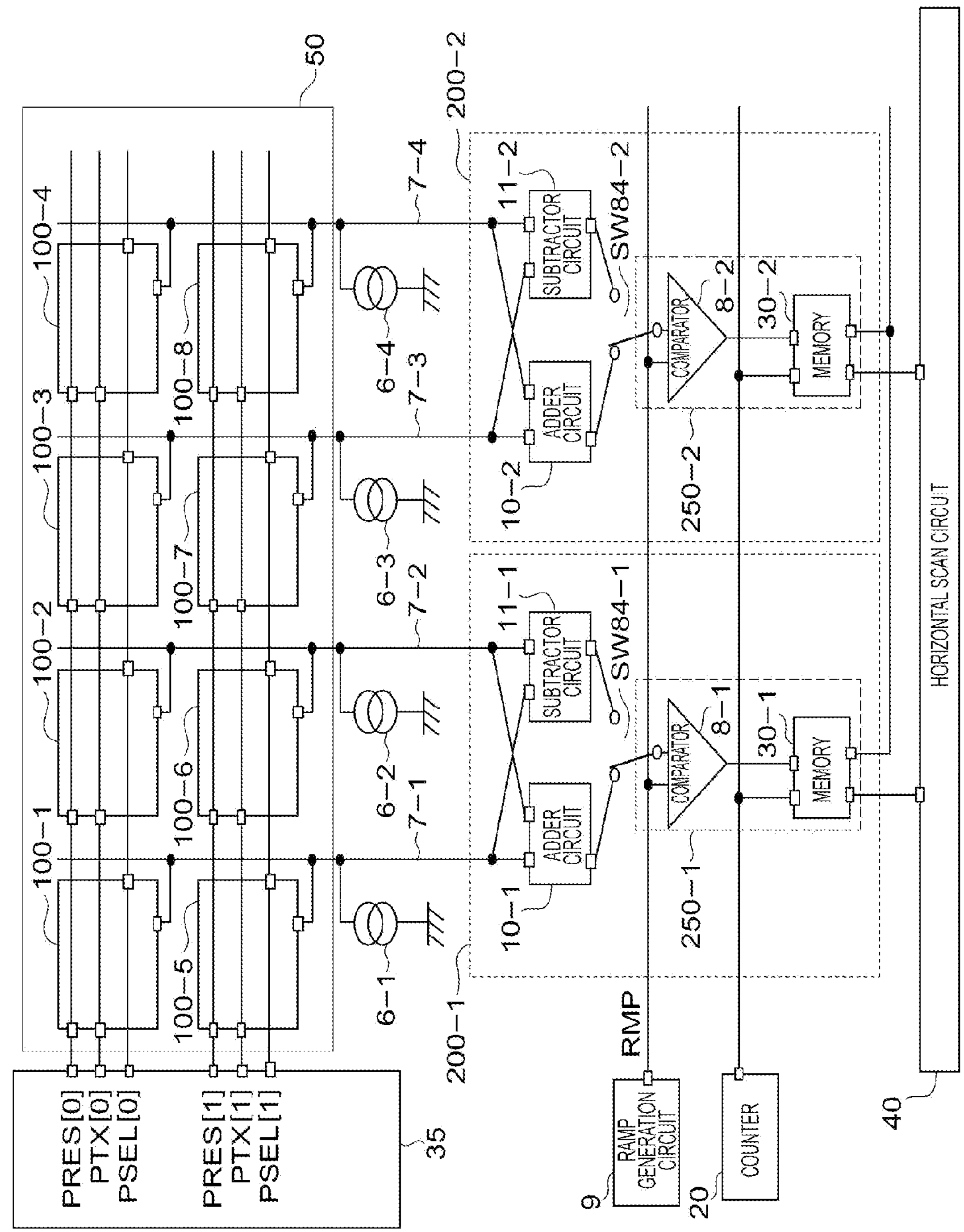
FIG. 5 is a diagram illustrating an example of the configuration of the imaging apparatus.

FIG. 5 is a diagram illustrating the imaging apparatus of the embodiment. In FIG. 5, the same reference numerals as those assigned in FIG. 1 are also assigned to members having the same functions as those illustrated in FIG. 1.

The imaging apparatus of the embodiment is provided with one comparator 8-1 for the pixels 100-1 and 100-2 on two columns. In other words, a signal is input into the comparator 8-1 from one of the adder circuit 10-1 and the subtractor circuit 11-1 via a switch SW84-1. The switch SW84-1 is a selection circuit that selects one of the outputs of the adder circuit 10-1 and the subtractor circuit 11-1 as a signal to be input into the comparator 8-1, based on a control signal input from the timing generator.

Figure 6:
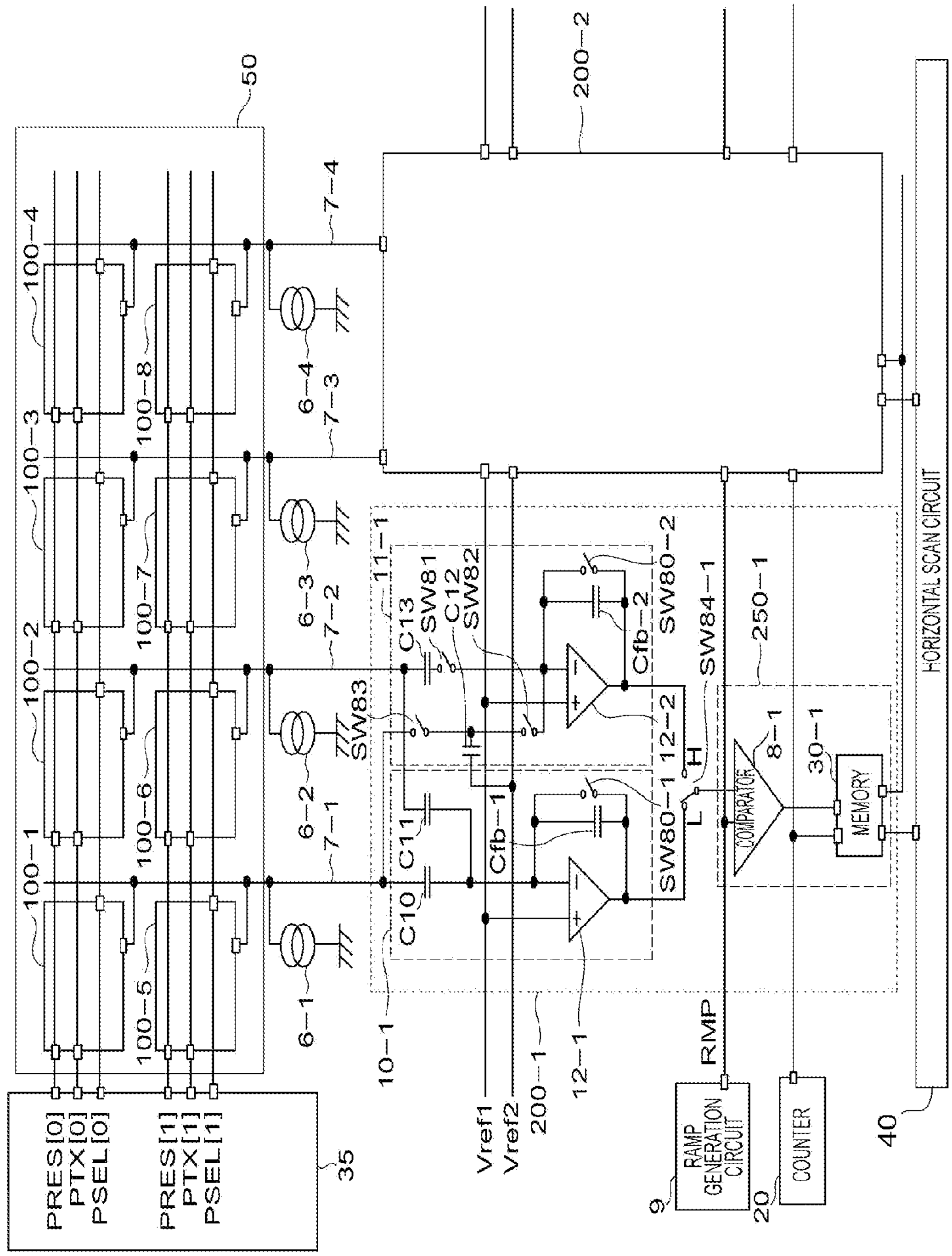
FIG. 6 is a diagram illustrating an example of the configuration of the imaging apparatus.

FIG. 6 is a diagram illustrating the details of the signal processing circuit 200-1 of the imaging apparatus illustrated in FIG. 5, and the configuration of the imaging apparatus. In FIG. 6, the same reference numerals as those assigned in FIG. 2 are also assigned to members having the same functions as those illustrated in FIG. 2. A description is given below of an example where the pixels 100-1 to 100-4 of the first row output signals to the vertical signal lines 7-1 to 7-4, respectively.

A capacitive element C10 is provided on an electrical path between the pixel 100-1 and the inverting input node of the inverting amplifier 12-1. A capacitive element C11 is provided on an electrical path between the pixel 100-2 and the inverting input node of the inverting amplifier 12-1. A capacitive element C12 is connected at one node to an electrical path between the pixel 100-1 and the inverting input node of the inverting amplifier 12-2 via switches SW82 and SW83. Moreover, a reference potential Vref2 is input into the other node of the capacitive element C12 from the reference potential supply unit. A switch SW81 and a capacitive element C13 are provided on an electrical path between the pixel 100-2 and the inverting amplifier 12-2. The switch SW84-1 electrically connects the adder circuit 10-1 and the comparator 8-1 when a signal P_SW84 that controls the switch SW84-1 is at the L level. On the other hand, the switch SW84-1 electrically connects the subtractor circuit 11-1 and the comparator 8-1 when the signal P_SW84 is at the H level.

The memory 30-1 has a configuration including the sub-memories 300-1 and 301-1 as in FIG. 2.

Figure 7:
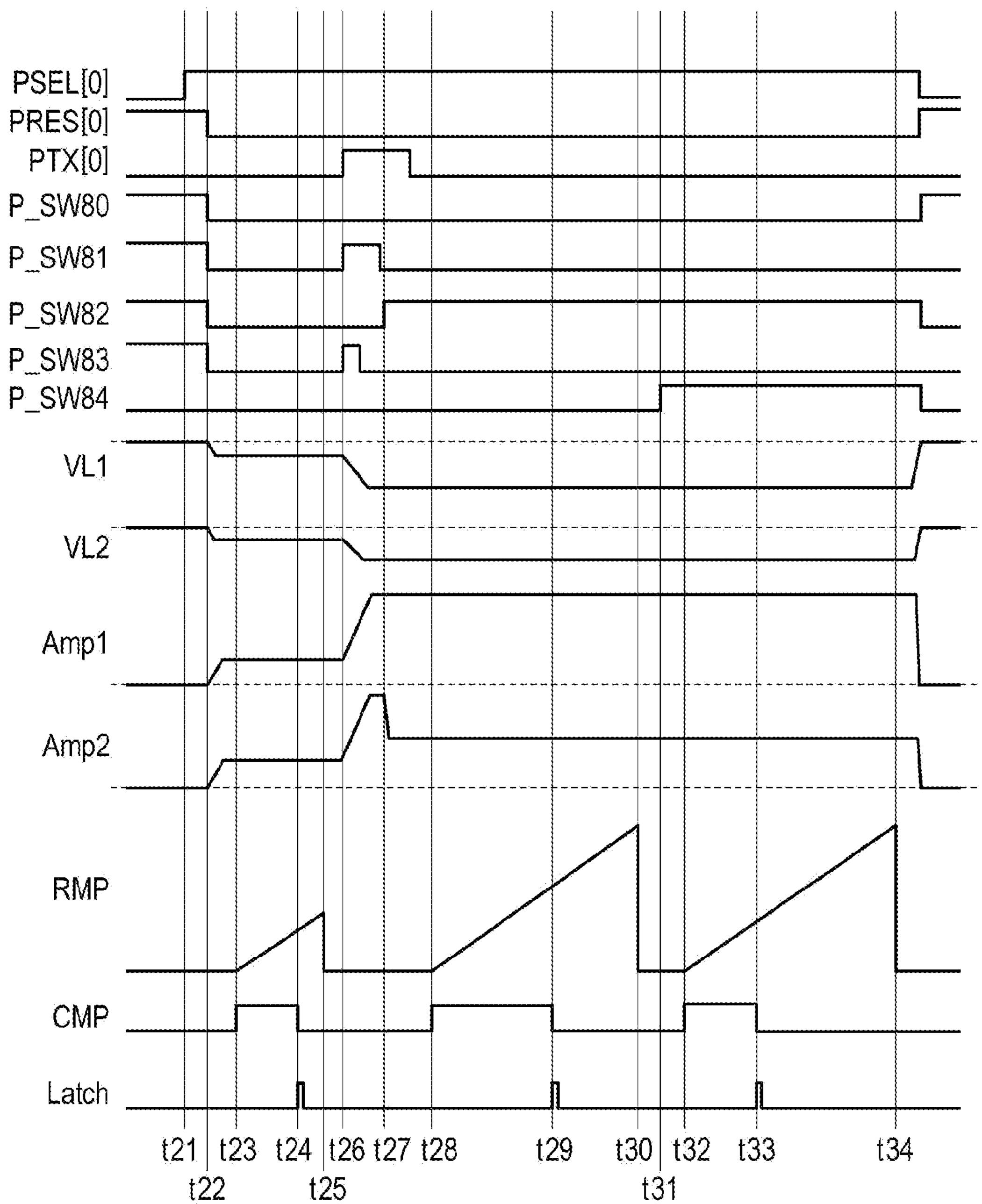
FIG. 7 is a diagram illustrating an example of the operation of the imaging apparatus.

Next, the operation of the imaging apparatus of the embodiment is described with reference to FIG. 7.

A signal P_SW80 is a signal that controls the switches SW80-1 and SW80-2. A signal P_SW81 is a signal that controls the switch SW81. A signal P_SW82 is a signal that controls the switch SW82. A signal P_SW83 is a signal that controls the switch SW83. A signal P_SW84 is a signal that controls the switch SW84.

At time t21, the vertical scan circuit 35 sets the signal PSEL[0] at the H level. Moreover, at time t21, the signals PRES[0], P_SW80, P_SW81, P_SW82, and P_SW83 are at the H level. Since the signal P_SW80 is at the H level, the charges of the feedback capacitive elements Cfb-1 and Cfb-2, and the capacitive elements C10 and C11 are respectively reset. Furthermore, since the signals P_SW81, P_SW82, and P_SW83 are at the H level, the charges of the capacitive elements C12 and C13 are respectively reset. Moreover, at time t21, the signals PTX[0] and P_SW84 are respectively at the L level.

At time t22, the vertical scan circuit 35 changes the signal PRES[0] from the H level to the L level. Moreover, the timing generator changes the signals P_SW80, P_SW81, P_SW82, and P_SW83 respectively from the H level to the L level. Consequently, the reset of the capacitive elements C10 to C14 and the feedback capacitive elements Cfb-1 and Cfb-2 is cancelled.

At time t23, the ramp generation circuit 9 starts the time-dependent change of the potential of the ramp signal RMP. Since the signal P_SW84 is at the L level, the comparator 8-1 compares the potential of the output Amp1 of the inverting amplifier 12-1 and the potential of the ramp signal RMP. The signal value of the comparison result signal CMP is at the H level at time t23.

At time t24, the signal value of the comparison result signal CMP changes from the H level to the L level. Consequently, the signal value of the latch signal Latch changes from the L level to the H level. The sub-memory 300-1 in the memory 30-1 holds the count signal at this point in time. The count signal held by the sub-memory 300-1 at time t24 is a digital signal based on the N1+N2 signal of the embodiment.

At time t25, the ramp generation circuit 9 ends the time-dependent change of the potential of the ramp signal RMP, and resets the potential of the ramp signal RMP. Moreover, the timing generator causes the sub-memory 301-1 to hold the digital signal held by the sub-memory 300-1.

At time t26, the vertical scan circuit 35 sets the signal PTX[0] at the H level. It is assumed here that the photoelectric conversion signal output by the pixel 100-1 is greater in signal amplitude than the photoelectric conversion signal output by the pixel 100-2. The vertical scan circuit 35 sets the signal PTX[0] at the H level, and accordingly, a signal of the sum of the photoelectric conversion signals of the pixels 100-1 and 100-2 is input into the inverting input node of the inverting amplifier 12-1. Moreover, the timing generator sets the signals P_SW81 and P_SW83 respectively at the H level. The signal P_SW81 is set at the H level, and accordingly, a signal based on the potential of the vertical signal line 7-2 is input into the inverting input node of the inverting amplifier 12-2. Moreover, the signal P_SW83 is set at the H level, the capacitive element C12 holds the photoelectric conversion signal of the pixel 100-1 based on the reference potential Vref2. The timing generator subsequently sets the signals P_SW81 and P_SW83 respectively at the L level. The reference potential Vref2 is a potential that shifts the potential of the output Amp2 in such a manner as to be farther from the start potential of the time-dependent potential change of the ramp signal RMP and closer to the end potential of the potential change, than the case where the capacitive element C12 holds the signal based on a reference potential Vref1.

At time t27, the timing generator sets the signal P_SW82 at the H level. Consequently, a signal of the difference between the photoelectric conversion signals of the pixels 100-1 and 100-2 is input into the inverting input node of the inverting amplifier 12-2. The vertical scan circuit 35 subsequently sets the signal PTX[0] at the L level.

At time t28, the ramp generation circuit 9 starts the time-dependent change of the potential of the ramp signal RMP. The signal value of the comparison result signal CMP is at the H level.

At time t29, the signal value of the comparison result signal CMP changes from the H level to the L level. Consequently, the potential of the latch signal Latch changes. The sub-memory 300-1 in the memory 30-1 holds the count signal at this point in time. The count signal held by the sub-memory 300-1 at this point in time is a digital signal based on the sum of the photoelectric conversion signals of the pixels 100-1 and 100-2. In other words, the count signal held by the sub-memory 300-1 at time t29 is a digital signal based on the A+N1+B+N2 signal of the embodiment.

At time t30, the ramp generation circuit 9 ends the time-dependent change of the potential of the ramp signal RMP, and resets the potential of the ramp signal RMP. The horizontal scan circuit 40 sequentially scans the memories 30-1 and 30-2 of the columns. Consequently, the digital signals held respectively by the sub-memories 300-1, 301-1, 300-2, and 301-2 in the memories 30-1 and 30-2 are input into the calculation unit.

At time t31, the timing generator sets the signal P_SW84 at the H level. Consequently, the output Amp2 of the inverting amplifier 12-2 is input into the comparator 8-1.

At time t32, the ramp generation circuit 9 starts the time-dependent change of the potential of the ramp signal RMP. The signal value of the comparison result signal CMP is at the H level.

At time t33, the signal value of the comparison result signal CMP changes from the H level to the L level. Consequently, the potential of the latch signal Latch changes. The sub-memory 300-1 in the memory 30-1 holds the count signal at this point in time. The count signal held by the memory 30-1 at this point in time is a digital signal based on the difference between the photoelectric conversion signals of the pixels 100-1 and 100-2. In other words, the count signal held by the sub-memory 300-1 at time t33 is a digital signal based on the (A+N1)−(B+N2) signal of the embodiment.

At time t34, the ramp generation circuit 9 ends the time-dependent change of the potential of the ramp signal RMP, and resets the potential of the ramp signal RMP. The horizontal scan circuit 40 sequentially scans the memories 30-1 and 30-2 of the columns. Consequently, the digital signals held by the sub-memories 300-1 and 300-2 in the memories 30-1 and 30-2 are input into the calculation unit.

The digital signals based respectively on the N1+N2 signal, the A+N1+B+N2 signal, and the (A+N1)−(B+N2) signal are input into the calculation unit from the memories 30-1 and 30-2 of the columns. The calculation unit generates a digital signal based on the A+B signal from the difference between the digital signal based on the A+N1+B+N2 signal and the digital signal based on the N1+N2 signal.

In the operation of the embodiment, the generation of a digital signal based on the difference between the N1 signal and the N2 signal is omitted. If it is sufficient for the A−B signal to be lower in accuracy than the A+B signal, the operation of the embodiment can be increased in speed by the amount equivalent to the omission of the generation of the digital signal based on the difference between the N1 and N2 signals. On the other hand, if the A−B signal is also to be obtained almost as accurately as the A+B signal obtained by the operation described in FIG. 7, the timing generator sets the signals P_SW82, P_SW83, and P_SW84 respectively at the H level after time t25. The AD conversion unit 250 then performs a similar AD conversion operation to the period from time t23 to time t25.

Moreover, if a further speedup is required, the generation of the digital signal based on the N1+N2 signal may be omitted. In other words, the operations related to the period from time t23 to t25 may be omitted.

Also in the imaging apparatus of the embodiment, CDS may be implemented using the capacitive elements C10, C11, C12, and C13 as in the first embodiment.

Also in the imaging apparatus of the embodiment, the digital signals based on the A−B signal and the A+B signal can be used for various applications as described in the first embodiment. For example, uses for focus detection and image generation are possible as described with reference to FIG. 4.

The imaging apparatus of the embodiment can reduce the number of comparators compared with the imaging apparatus of the first embodiment. Consequently, the total power consumption of the comparators provided in the imaging apparatus can be reduced compared with the imaging apparatus of the first embodiment. Moreover, the imaging apparatus of the embodiment can reduce the number of comparators and memories provided for the comparators compared with the imaging apparatus of the first embodiment, and can reduce the area of a peripheral circuit located around the pixel array 50 compared with the imaging apparatus of the first embodiment.

In the embodiment, a description has been given of the operation that the horizontal scan circuit 40 causes the memories 30-1 and 30-2 to output, to the calculation unit, the digital signals based respectively on the N1+N2 signal and the A+N1+B+N1 signal, and then causes the memories 30-1 and 30-2 to output, to the calculation unit, the digital signal based on the (A+N1)−(B+N2) signal. As another example, the memories 30-1 and 30-2 may further include sub-memories to make is possible to simultaneously hold digital signals based respectively on the N1+N2 signal, the A+N1+B+N1 signal, and the (A+N1)−(B+N2) signal. In this case, the horizontal scan circuit 40 can cause the memories 30-1 and 30-2 to output, to the calculation unit, digital signals based respectively on the N1+N2 signal, the A+N1+B+N1 signal, and the (A+N1)−(B+N2) signal.

Moreover, in the embodiment, the case where the output Amp1 of the inverting amplifier 12-1 is input into the comparator 8-1 and the case where the output Amp2 of the inverting amplifier 12-2 is input have the same potential amplitude where the potential of the ramp signal RMP changes depending on time. As another example, the case where the output Amp2 of the inverting amplifier 12-2 is input into the comparator 8-1 may have a smaller potential amplitude where the potential of the ramp signal RMP changes depending on time than the case where the output Amp1 of the inverting amplifier 12-1 is input. This is because the output Amp2 of the inverting amplifier 12-2 may have a smaller signal amplitude than the output Amp1 of the inverting amplifier 12-1. Consequently, the AD conversion period for generating a digital signal based on the output Amp2 of the inverting amplifier 12-2 can be shortened compared with the operation described with reference to FIG. 7.

Third Embodiment

An imaging apparatus of the embodiment is described, focusing on points different from the second embodiment.

Figure 8:
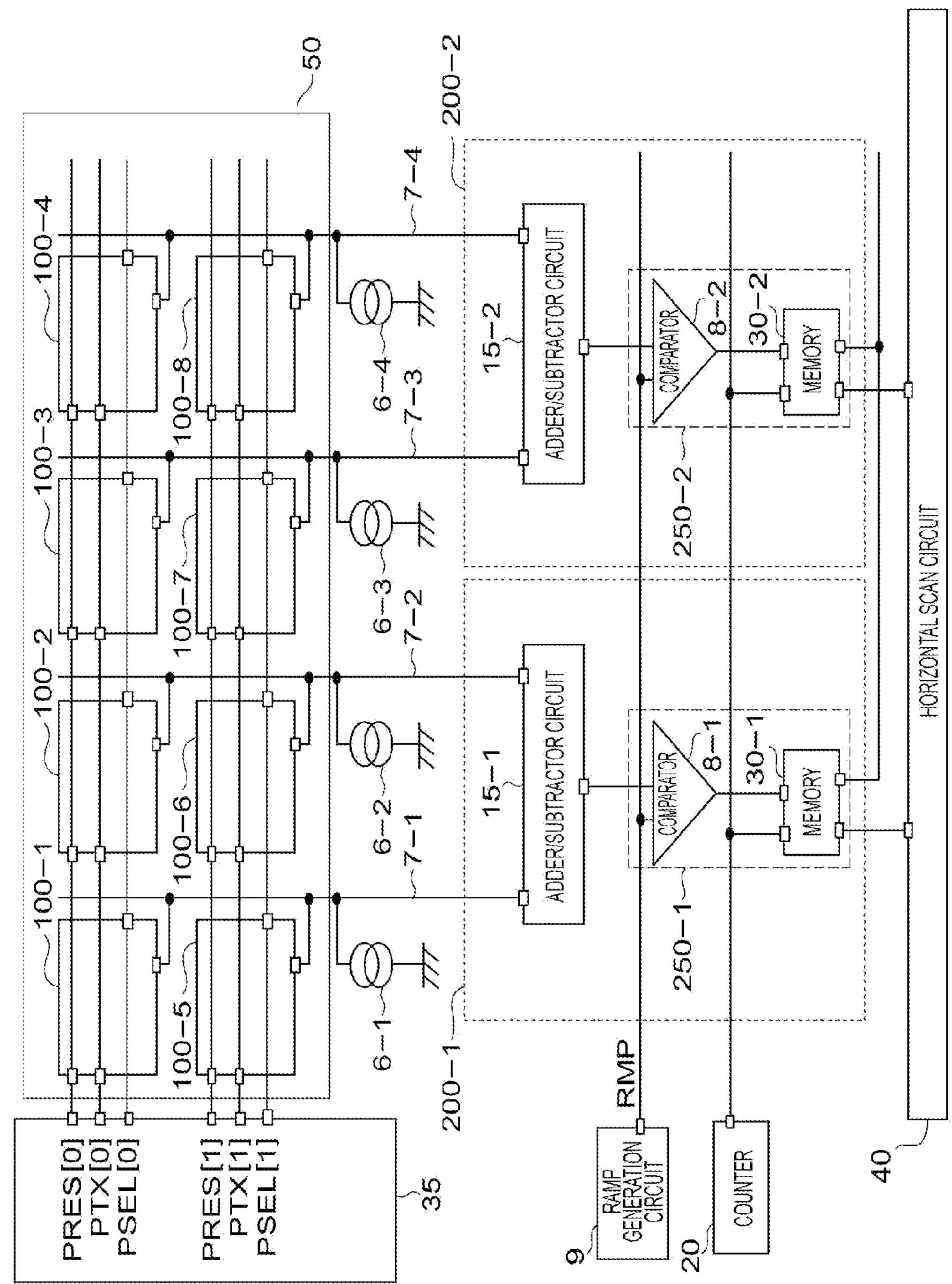
FIG. 8 is a diagram illustrating an example of the configuration of the imaging apparatus.

FIG. 8 is a diagram illustrating the imaging apparatus of the embodiment. In FIG. 8, the same reference numerals as those assigned in FIG. 5 are also assigned to members having the same functions as those illustrated in FIG. 5.

The signal processing circuits 200-1 and 200-2 of the imaging apparatus illustrated in FIG. 5 include the adder circuits 10-1 and 10-2, and the subtractor circuits 11-1 and 11-2. The imaging apparatus of the embodiment, on the other hand, includes adder/subtractor circuits 15-1 and 15-2 instead of the adder circuits 10-1 and 10-2, and the subtractor circuits 11-1 and 11-2. Moreover, in the imaging apparatus illustrated in FIG. 5, one of the outputs of the adder circuit 10-1 and the subtractor circuit 11-1 is selected by the switch SW84-1 as a signal to be input into the comparator 8-1. On the other hand, in the imaging apparatus of the embodiment, a signal output by the adder/subtractor circuit 15-1 is input into the comparator 8-1. The circuit unit into which the first and the second photoelectric conversion signal are input is the adder/subtractor circuit 15-1.

Figure 9:
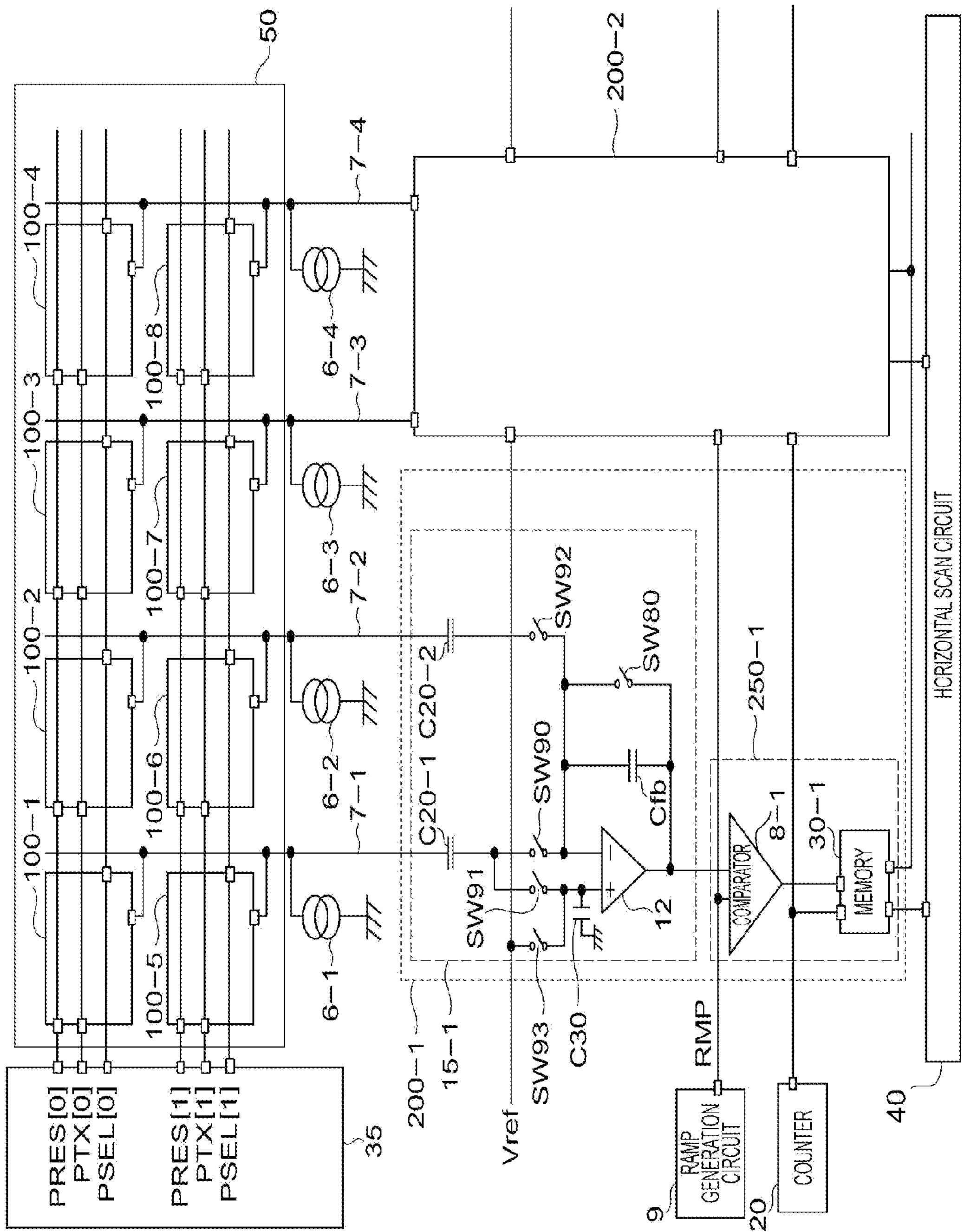
FIG. 9 is a diagram illustrating an example of the configuration of the imaging apparatus.

FIG. 9 is a diagram illustrating the details of the adder/subtractor circuit 15 of the imaging apparatus illustrated in FIG. 8, and the configuration of the imaging apparatus. In FIG. 9, the same reference numerals as those assigned in FIG. 6 are also assigned to members having the same functions as those illustrated in FIG. 6.

The adder/subtractor circuit 15-1 includes capacitive elements C20-1, C20-2, and C30, switches SW80, SW90, SW91, SW92, and SW93, an inverting amplifier 12, and a feedback capacitive element Cfb. The switch SW90 is provided on an electrical path between the capacitive element C20-1 and an inverting input node of the inverting amplifier 12. The switch SW91 is provided on an electrical path between the capacitive element C20-1 and a non-inverting input node of the inverting amplifier 12. The switch SW92 is provided on an electrical path between the capacitive element C20-2 and the inverting input node of the inverting amplifier 12. The capacitive elements C20-1 and C20-2 respectively hold charges based on the potentials of the vertical signal lines 7-1 and 7-2. The switch SW93 is provided on an electrical path that inputs the reference potential Vref into the non-inverting input node of the inverting amplifier 12.

A signal output by the inverting amplifier 12 is input into the comparator 8-1.

Figure 10:
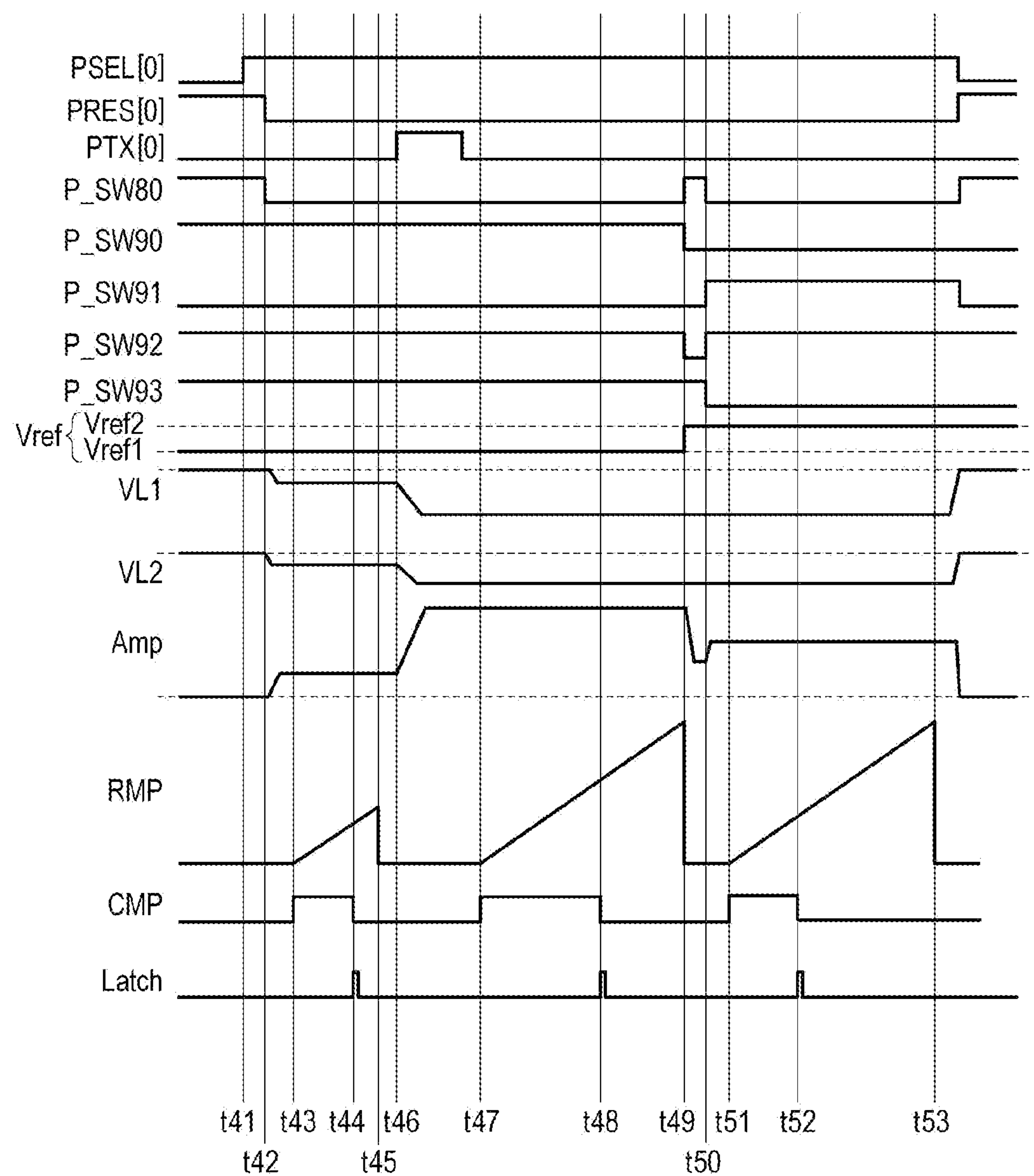
FIG. 10 is a diagram illustrating an example of the operation of the imaging apparatus.

FIG. 10 is a timing diagram illustrating the operation of the imaging apparatus illustrated in FIG. 9. Signals P_SW80, P_SW90, P_SW91, P_SW92, and P_SW93 are signals that control the switches SW80, SW90, SW91, SW92, and SW93 respectively. Amp denotes the output of the inverting amplifier 12.

At time t41, the vertical scan circuit 35 sets the signal PSEL[0] at the H level. Moreover, at time t41, the signals PRES[0], P_SW80, P_SW90, P_SW92, and P_SW93 are at the H level. Since the signal P_SW80 is at the H level, the charge of the feedback capacitive element Cfb is reset. Moreover, since the signal P_SW90 is at the H level, the charge of the capacitive element C20-1 is reset. Moreover, since the signal P_SW92 is at the H level, the charge of the capacitive element C20-2 is reset. Moreover, since the signal P_SW93 is at the H level, the reference potential Vref of the potential Vref1 is input into the non-inverting input node of the inverting amplifier 12 from the reference potential supply unit.

Moreover, at time t41, the signals PTX[0] and P_SW91 are at the L level.

At time t42, the vertical scan circuit 35 changes the signal PRES[0] from the H level to the L level. Moreover, the timing generator changes the signal P_SW80 from the H level to the L level. Consequently, the reset of the feedback capacitive element Cfb and the capacitive elements C20-1 and C20-2 is cancelled. A signal of the sum of the noise signals of the pixels 100-1 and 100-2 is input into the inverting input node of the inverting amplifier 12. The output Amp of the inverting amplifier 12 has the potential of a signal obtained by inverting and amplifying the signal of the sum of the noise signals of the pixels 100-1 and 100-2.

At time t43, the ramp generation circuit 9 starts the time-dependent change of the potential of the ramp signal RMP. The signal value of the comparison result signal CMP is at the H level.

At time t44, the signal value of the comparison result signal CMP changes from the H level to the L level. Consequently, the potential of the latch signal Latch changes. The sub-memory 300-1 in the memory 30-1 holds the count signal at this point in time. The count signal held by the memory 30-1 at this point in time is the digital signal based on the sum of the noise signals of the pixels 100-1 and 100-2. In other words, the count signal held by the sub-memory 300-1 at time t44 is a digital signal based on the N1+N2 signal of the embodiment.

At time t45, the ramp generation circuit 9 ends the time-dependent change of the potential of the ramp signal RMP, and resets the potential of the ramp signal RMP. Moreover, the timing generator causes the sub-memory 301-1 to hold the digital signal held by the sub-memory 300-1.

At time t46, the vertical scan circuit 35 sets the signal PTX[0] at the H level. It is assumed here that the photoelectric conversion signal output by the pixel 100-1 is greater in signal amplitude than the photoelectric conversion signal output by the pixel 100-2. The output Amp of the inverting amplifier 12 has the potential of a signal obtained by inverting and amplifying a signal of the sum of the photoelectric conversion signals of the pixels 100-1 and 100-2. The vertical scan circuit 35 subsequently sets the signal PTX[0] at the L level.

At time t47, the ramp generation circuit 9 starts the time-dependent change of the potential of the ramp signal RMP. The signal value of the comparison result signal CMP is at the H level.

At time t48, the signal value of the comparison result signal CMP changes from the H level to the L level. Consequently, the potential of the latch signal Latch changes. The sub-memory 300-1 in the memory 30-1 holds the count signal at this point in time. The count signal held by the sub-memory 300-1 at this point in time is the digital signal based on the sum of the photoelectric conversion signals of the pixels 100-1 and 100-2. In other words, the count signal held by the sub-memory 300-1 at time t48 is a digital signal based on the A+N1+B+N2 signal of the embodiment.

At time t49, the ramp generation circuit 9 ends the time-dependent change of the potential of the ramp signal RMP, and resets the potential of the ramp signal RMP. The horizontal scan circuit 40 sequentially scans the memories 30-1 and 30-2 of the columns. Consequently, the digital signals held respectively by the sub-memories 300-1, 301-1, 300-2, and 301-2 in the memories 30-1 to 30-2 are input into the calculation unit.

Moreover, at time t49, the timing generator changes the reference potential Vref from the potential Vref1 to the potential Vref2 greater than the potential Vref1. Moreover, the timing generator sets the signals P_SW90 and P_SW92 at the L level. Moreover, the timing generator sets the signal P_SW80 at the H level.

Consequently, the charge of the feedback capacitive element Cfb is reset. Moreover, the output Amp of the inverting amplifier 12 has a potential based on the potential Vref2 of the reference potential Vref. The potential Vref2 is a potential that shifts the potential of the output Amp in such a manner as to be farther from the start potential of the time-dependent potential change of the ramp signal RMP and closer to the end potential of the potential change, than the case where the inverting amplifier 12 generates a signal based on the potential Vref1.

At time t50, the timing generator sets the signal P_SW80 at the L level. Consequently, the reset of the feedback capacitive element Cfb is cancelled. Moreover, the timing generator sets the signal P_SW91 at the H level. Consequently, the photoelectric conversion signal of the pixel 100-1 is input into the non-inverting input node of the inverting amplifier 12. Moreover, the timing generator sets the signal P_SW92 at the H level. Consequently, the photoelectric conversion signal of the pixel 100-2 is input into the inverting input node of the inverting amplifier 12. The output Amp of the inverting amplifier 12 has the potential of a signal obtained by inverting and amplifying a signal of the difference between the photoelectric conversion signals of the pixels 100-1 and 100-2.

At time t51, the ramp generation circuit 9 starts the time-dependent change of the potential of the ramp signal RMP. The signal value of the comparison result signal CMP is at the H level.

At time t52, the signal value of the comparison result signal CMP changes from the H level to the L level. Consequently, the potential of the latch signal Latch changes. The sub-memory 300-1 in the memory 30-1 holds the count signal at this point in time. The count signal held by the memory 30-1 at this point in time is the digital signal based on the difference between the photoelectric conversion signals of the pixels 100-1 and 100-2. In other words, the count signal held by the sub-memory 300-1 at time t33 is the digital signal based on the (A+N1)−(B+N2) signal of the embodiment.

At time t53, the ramp generation circuit 9 ends the time-dependent change of the potential of the ramp signal RMP, and resets the potential of the ramp signal RMP. The horizontal scan circuit 40 sequentially scans the memories 30-1 and 30-2 of the columns. Consequently, the digital signal held by the sub-memory 300-1 in the memory 30-1 is input into the calculation unit.

The signal processing of the calculation unit can be set as similar to the second embodiment.

The imaging apparatus of the embodiment can reduce the number of the inverting amplifiers 12 compared with the imaging apparatus of the second embodiment. Consequently, power consumption and the area of a circuit that does addition and subtraction of signals output by a plurality of pixels can be reduced by the amount equivalent to the reduction in the number of the inverting amplifiers 12 of the imaging apparatus.

Fourth Embodiment

Figure 11:
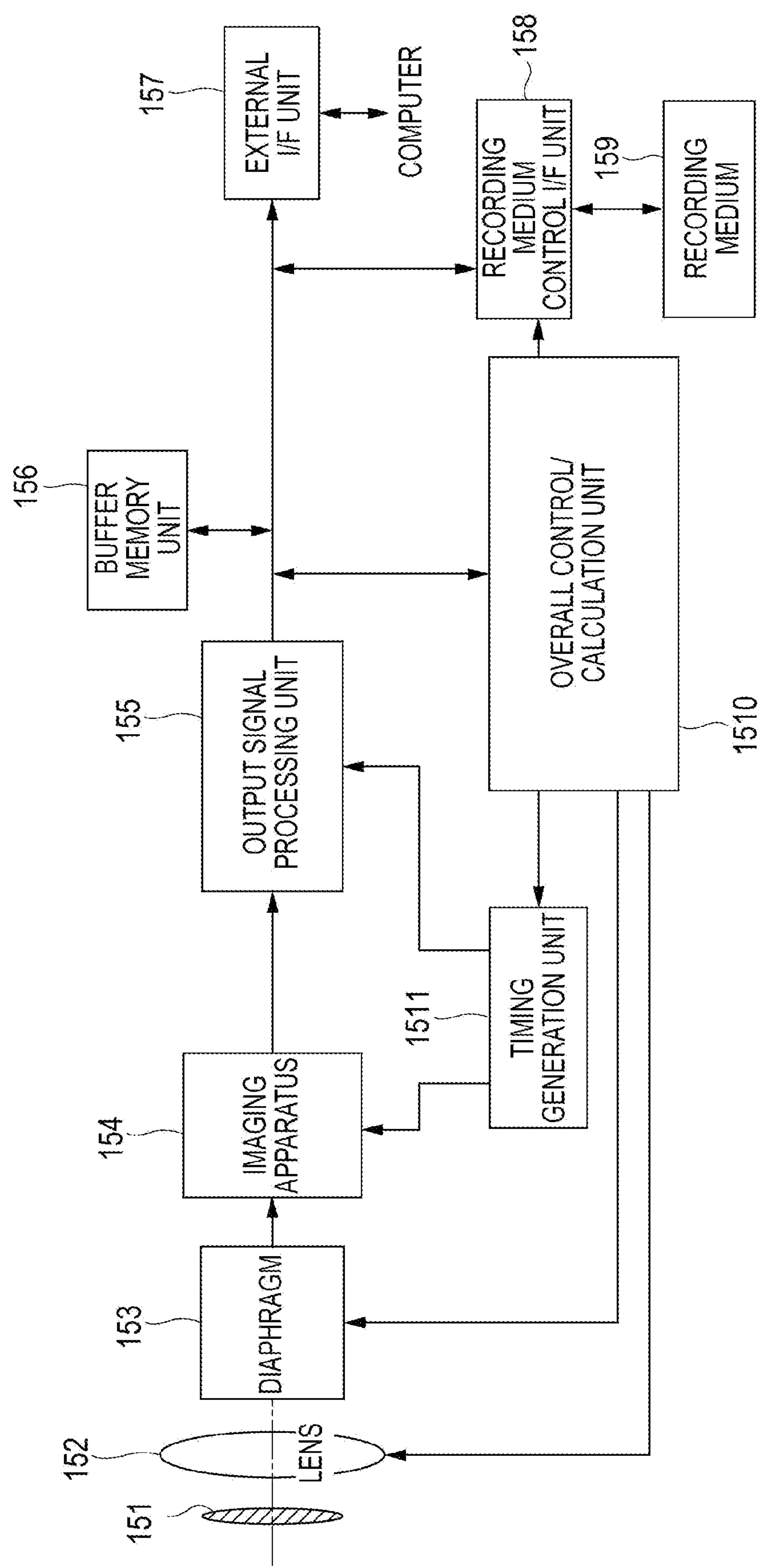
FIG. 11 is a diagram illustrating an example of the configuration of an imaging system.

A description is given of an embodiment of a case where the imaging apparatuses hitherto described in the first to third embodiment are applied to an imaging system. Examples of the imaging system include a digital still camera, a digital camcorder, and a monitoring camera. FIG. 11 illustrates a schematic diagram of a case where the imaging apparatus is applied to a digital still camera as an example of the imaging system.

In FIG. 11, the imaging system includes a lens 152 that allows the formation of an optical image of a photographic subject on an imaging apparatus 154, a barrier 151 for protecting the lens 152, and a diaphragm 153 capable of changing the amount of light that has passed through the lens 152. The lens 152 and the diaphragm 153 are optical systems that guide light to the imaging apparatus 154. Moreover, the imaging system includes an output signal processing unit 155 that processes an output signal output by the imaging apparatus 154.

The output signal processing unit 155 includes a digital signal processing unit, and performs the operations of making various corrections and compression on a signal output by the imaging apparatus 154 as needed and outputting the signal. The output signal processing unit 155 described here corresponds to the output signal processing unit of the imaging system described in the first embodiment.

Moreover, the imaging system includes a buffer memory unit 156 for temporarily storing image data, and a recording medium control interface unit 158 for recording in a recording medium or reading. Furthermore, the imaging system includes a detachable recording medium 159, such as a semiconductor memory, for recording or reading out imaging data. Furthermore, the imaging system includes an external interface unit 157 for communicating with an external computer and the like, an overall control/calculation unit 1510 for various calculations and the control of the entire digital still camera, and the imaging apparatus 154. Furthermore, the imaging system includes, in the output signal processing unit 155, a timing generation unit 1511 that outputs various timing signals. The timing signal and the like may be input from the outside. It is sufficient if the imaging system includes at least the imaging apparatus 154 and the output signal processing unit 155 that processes an output signal output from the imaging apparatus 154. Moreover, in the case of the configuration of the imaging apparatus illustrated in FIG. 4, the output signal processing unit 155 can process a focus detection signal. Furthermore, the output signal processing unit 155 can generate an image from a digital signal based on the A+B signal.

As described above, the imaging system of the embodiment can perform an imaging operation with the application of the imaging apparatus 154.

In order to serve various purposes required for an imaging apparatus, the present invention provides an imaging apparatus that generates a signal based on the sum of signals output by a plurality of pixels, and a signal based on the difference between signals output by the plurality of pixels respectively, and performs AD conversion on each of the generated signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126704, filed Jun. 17, 2013, which is hereby incorporated by reference herein in its entirety.

What is claimed is:

1. An imaging apparatus comprising:

a first and a second pixel each including a photoelectric conversion unit to generate signal charge based on incident light, the first and the second pixel configured to output a first and a second photoelectric conversion signal respectively;

a circuit configured to generate a first signal based on a sum of the first and the second photoelectric conversion signal, and a second signal based on a difference between the first and the second photoelectric conversion signal, respectively; and an AD conversion unit configured to convert the first and the second signal respectively into digital signals.

2. The imaging apparatus according to claim 1, wherein the first and the second pixel each includes an amplification transistor having a node into which the signal charge is input from the photoelectric conversion unit, and the first and the second photoelectric conversion signal are signals to be output by the amplification transistors based on the potentials of the nodes.

3. The imaging apparatus according to claim 2, the first and the second pixel each further includes a reset unit configured to reset the potential of the node, the first and the second pixel output a first and a second noise signal from the amplification transistors based on the potentials of the nodes reset by the reset unit, respectively, the circuit generates a third signal based on a sum of the first and the second noise signal, and the AD conversion unit converts the third signal into a digital signal.

4. The imaging apparatus according to claim 3, further comprising a calculation unit, wherein the calculation unit generates a signal of a difference between the digital signal based on the first signal generated by the AD conversion unit, and the digital signal based on the third signal generated by the AD conversion unit.

5. The imaging apparatus according to claim 3, wherein the circuit further generates a fourth signal based on the difference between the first and the second noise signal based on the reset potentials of the nodes, and the AD conversion unit converts the fourth signal into a digital signal.

6. The imaging apparatus according to claim 5, further comprising a calculation unit, wherein the calculation unit generates a signal of a difference between the digital signal based on the first signal generated by the AD conversion unit, and the digital signal based on the third signal generated by the AD conversion unit, and a signal of a difference between the digital signal based on the second signal generated by the AD conversion unit, and the digital signal based on the fourth signal generated by the AD conversion unit.

7. The imaging apparatus according to claim 1, further comprising:

a ramp generation circuit configured to output a ramp signal; and a counter configured to output a count signal representing the count of clock signals, wherein the AD conversion unit includes a comparator and a count signal holding unit, the comparator outputs, to the count signal holding unit, a comparison result signal indicating a result of comparing the signal generated by the circuit and the ramp signal, and the count signal holding unit holds the count signal based on a change in the signal value of the comparison result signal and accordingly the AD conversion unit converts the first and the second signal into digital signals.

8. The imaging apparatus according to claim 7, further comprising a plurality of the AD conversion units, wherein the circuit includes an adder circuit and a subtractor circuit, which generate the first and the second signal, one said comparator is electrically connected to the adder circuit, and another comparator is electrically connected to the subtractor circuit.

9. The imaging apparatus according to claim 8, further comprising a reference potential supply unit, wherein the adder circuit includes a first inverting amplifier, the subtractor circuit includes a second inverting amplifier, the reference potential supply unit supplies a first reference potential to the first inverting amplifier, and a second reference potential to the second inverting amplifier, the first inverting amplifier uses the first reference potential to generate the first signal obtained by amplifying a signal of the sum of the first and the second photoelectric conversion signal, the second inverting amplifier uses the second reference potential to generate the second signal obtained by amplifying a signal of the difference between the first and the second photoelectric conversion signal, and the second reference potential is a potential that shifts the second signal in such a manner as to be farther from a start potential of time-dependent potential change of the ramp signal and closer to an end potential of the potential change, than a case where the second inverting amplifier generates the second signal at the first reference potential.

10. The imaging apparatus according to claim 7, further comprising:

a plurality of pixels including the first and the second pixel; and a selection circuit, wherein the plurality of pixels is arranged in matrix form, the first and the second pixel are arranged on columns different from each other, the circuit includes an adder circuit and a subtractor circuit, which generate the first and the second signal, respectively, and the selection circuit electrically connects one of the adder circuit and the subtractor circuit to one said comparator.

11. The imaging apparatus according to claim 10, further comprising a reference potential supply unit, wherein the adder circuit includes a first inverting amplifier, the subtractor circuit includes a second inverting amplifier, the reference potential supply unit supplies a first reference potential to the first inverting amplifier, and a second reference potential to the second inverting amplifier, the first inverting amplifier uses the first reference potential to generate the first signal obtained by amplifying a signal of the sum of the first and the second photoelectric conversion signal, the second inverting amplifier uses the second reference potential to generate the second signal obtained by amplifying a signal of the difference between the first and the second photoelectric conversion signal, and the second reference potential is a potential that shifts the second signal in such a manner as to be farther from a start potential of time-dependent potential change of the ramp signal and closer to an end potential of the potential change, than a case where the second inverting amplifier generates the second signal at the first reference potential.

12. The imaging apparatus according to claim 7, wherein the circuit includes one inverting amplifier configured to output the first and the second signal, and one said comparator is provided for the one inverting amplifier.

13. The imaging apparatus according to claim 12, further comprising a reference potential supply unit, wherein the reference potential supply unit supplies a first and a second reference potential to the inverting amplifier, the inverting amplifier uses the first reference potential to generate the first signal obtained by amplifying a signal of the sum of the first and the second photoelectric conversion signal, the inverting amplifier uses the second reference potential to generate the second signal obtained by amplifying a signal of the difference between the first and the second photoelectric conversion signal, and the second reference potential is a potential that shifts the second signal in such a manner as to be farther from a start potential of time-dependent potential change of the ramp signal and closer to an end potential of the potential change, than a case where the inverting amplifier generates the second signal at the first reference potential.

14. The imaging apparatus according to claim 1, further comprising one microlens configured to concentrate light on the first and the second pixel.

15. An imaging system comprising:

the imaging apparatus according to claim 14; and an output signal processing unit, wherein the output signal processing unit performs focus detection based on the digital signal based on the second signal, and generates an image based on the digital signal based on the first signal, the digital signal having been output by the imaging apparatus.

16. An imaging system comprising:

the imaging apparatus according to claim 1; and an output signal processing unit configured to generate an image based on a signal output by the imaging apparatus.

17. A method for driving an imaging apparatus including a first and a second pixel each having a photoelectric conversion unit to generate signal charge based on incident light, a circuit unit, and an AD conversion unit, the method comprising:

outputting, by each of the first and the second pixel, a first and a second photoelectric conversion signal to the circuit unit by the photoelectric conversion units of the first and the second pixel being exposed to light at the same exposure end timing;

generating, by the circuit unit, a first signal based on a sum of the first and the second photoelectric conversion signal, and a second signal based on a difference between the first and the second photoelectric conversion signal, respectively; and converting the first and the second signal respectively into digital signals by the AD conversion unit.

18. The method for driving the imaging apparatus according to claim 17, wherein the AD conversion unit includes a comparator and a count signal holding unit, the comparator outputs, to the count signal holding unit, a first comparison result signal indicating a result of comparing the first signal and a ramp signal, and a second comparison result signal indicating a result of comparing the second signal and the ramp signal, respectively, the count signal holding unit holds a count signal representing the count of clock signals based on changes in the signal values of the first and the second comparison result signal respectively and accordingly the AD conversion unit converts the first and the second signal into digital signals respectively, and a case where the comparator compares the second signal and the ramp signal has a smaller potential amplitude where the potential of the ramp signal changes depending on time, than a case where the comparator compares the first signal and the ramp signal.

19. The method for driving the imaging apparatus according to claim 17, wherein the AD conversion unit includes a comparator and a count signal holding unit, the comparator outputs, to the count signal holding unit, a first comparison result signal indicating a result of comparing the first signal and a ramp signal, and a second comparison result signal indicating a result of comparing the second signal and the ramp signal, respectively, the count signal holding unit holds a count signal representing the count of clock signals based on changes in the signal values of the first and the second comparison result signal respectively and accordingly the AD conversion unit converts the first and the second signal into digital signals respectively, and the imaging apparatus further includes a first inverting amplifier, and a second inverting amplifier, the first inverting amplifier uses a first reference potential to generate the first signal obtained by amplifying a signal of the addition of the first and the second photoelectric conversion signal, the second inverting amplifier uses a second reference potential to generate the second signal obtained by amplifying a signal of the difference between the first and the second photoelectric conversion signal, and the second reference potential is a potential that shifts the second signal in such a manner as to be farther from a start potential of time-dependent potential change of the ramp signal and closer to an end potential of the potential change, than a case where the second inverting amplifier generates the second signal at the first reference potential.

20. The method for driving the imaging apparatus according to claim 17, wherein the AD conversion unit includes a comparator and a count signal holding unit, the comparator outputs, to the count signal holding unit, a first comparison result signal indicating a result of comparing the first signal and a ramp signal, and a second comparison result signal indicating a result of comparing the second signal and the ramp signal, respectively, the count signal holding unit holds a count signal representing the count of clock signals based on changes in the signal values of the first and the second comparison result signal respectively and accordingly the AD conversion unit converts the first and the second signal into digital signals respectively, the imaging apparatus further includes an inverting amplifier, the inverting amplifier uses a first reference potential to generate the first signal obtained by amplifying a signal of the addition of the first and the second photoelectric conversion signal, the inverting amplifier uses a second reference potential to generate the second signal obtained by amplifying a signal of the difference between the first and the second photoelectric conversion signal, and the second reference potential is a potential that shifts the second signal in such a manner as to be farther from a start potential of time-dependent potential change of the ramp signal and closer to an end potential of the potential change, than a case where the inverting amplifier generates the second signal at the first reference potential.

21. A method for driving an imaging system including an imaging apparatus and an output signal processing unit, the imaging apparatus including:

a first pixel and a second pixel, the first and the second pixel each having a photoelectric conversion unit to generate signal charge based on incident light; one microlens configured to concentrate light on the first and the second pixel; a circuit unit; and an AD conversion unit, the method comprising:

outputting, by each of the first and the second pixel, a first and a second photoelectric conversion signal to the circuit unit by the photoelectric conversion units of the first and the second pixel being exposed to light at the same exposure end timing;

generating, by the circuit unit, a first signal based on a sum of the first and the second photoelectric conversion signal, and a second signal based on a difference between the first and the second photoelectric conversion signal, respectively;

converting the first and the second signal respectively into digital signals by the AD conversion unit;

outputting the digital signal based on the first signal and the digital signal based on the second signal respectively to the output signal processing unit by the imaging apparatus; and generating an image by the digital signal based on the first signal, and performing focus detection by the digital signal based on the second signal by the output signal processing unit.

* * * * *